(12) United States Patent
Villamar

(10) Patent No.: US 12,280,954 B2
(45) Date of Patent: *Apr. 22, 2025

(54) SYSTEM AND METHOD FOR AUTOMATED DELIVERY OF REFRIGERATED PERISHABLE ITEMS

(71) Applicant: Daniel Villamar, North Las Vegas, NV (US)

(72) Inventor: Daniel Villamar, North Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/599,347

(22) Filed: Mar. 8, 2024

(65) Prior Publication Data

US 2024/0208730 A1 Jun. 27, 2024

Related U.S. Application Data

(63) Continuation-in-part of application No. 17/727,704, filed on Apr. 23, 2022, now Pat. No. 12,026,658.

(51) Int. Cl.
| | |
|---|---|
| *B65G 1/137* | (2006.01) |
| *F03D 3/00* | (2006.01) |
| *F03D 9/25* | (2016.01) |
| *F03D 9/43* | (2016.01) |

(52) U.S. Cl.
CPC .......... *B65G 1/1373* (2013.01); *F03D 3/005* (2013.01); *F03D 9/25* (2016.05); *F03D 9/43* (2016.05); *F05B 2220/706* (2013.01); *F05B 2240/9113* (2013.01)

(58) Field of Classification Search
CPC .......... B65G 1/1373; F03D 9/25; F03D 3/005
See application file for complete search history.

(56) References Cited

U.S. PATENT DOCUMENTS

| | | | |
|---|---|---|---|
| 2019/0180226 A1* | 6/2019 | Villamar | G06Q 10/08 |
| 2020/0082338 A1* | 3/2020 | Torita | G06Q 10/08355 |
| 2021/0190032 A1* | 6/2021 | Power, III | F03B 17/061 |
| 2022/0119210 A1* | 4/2022 | Felton | G06Q 50/10 |

\* cited by examiner

*Primary Examiner* — George Chen
*Assistant Examiner* — Duane N. Moore
(74) *Attorney, Agent, or Firm* — Briggs IP; Jeremy A. Briggs

(57) ABSTRACT

A method of selling goods to a customer, comprising: loading a variety of goods into a plurality of dispenser robots; receiving an order for goods by a customer over a communications network; causing a delivery vehicle to move along a guideway to at least one location of at least one dispenser robot in the plurality of dispenser robots responsive to receiving the order; causing dispensing of goods from the at least one dispenser robot into the delivery vehicle; causing the delivery vehicle to load onto an aerial tramway responsive to causing dispensing of the goods; causing the delivery vehicle to move to a destination point on aerial tramway; and causing presenting the goods in the delivery vehicle to the customer at the destination point.

20 Claims, 12 Drawing Sheets

| ITEM | BRAND | QUANTITY | LOCATION TO DELIVER TO | WHEN TO DELIVER |
|---|---|---|---|---|
| Cereal | Corn Flakes | 2 | Customers Residence | 3rd of every month |
| Bread | Wonder | 3 | Customers Residence | 3rd of every month |
| Milk | Smiths | 1 | Customers Residence | 3rd of every month |
| Tomato | | 4 | Customers Residence | 3rd of every month |
| | | | | |
| | | | | |
| | | | | |

+# SYSTEM AND METHOD FOR AUTOMATED DELIVERY OF REFRIGERATED PERISHABLE ITEMS

The present application is a continuation-in-part of and claims priority from all priority dates of U.S. patent application Ser. No. 17/727,704, filed Apr. 23, 2022, and entitled "System and method for automated delivery of refrigerated perishable items", the disclosure of which is incorporated herein, in its entirety, by reference.

FIELD OF THE INVENTION

The present invention relates broadly to distribution of perishable goods to consumers. More particularly, the present invention relates to an automated process of placing ordered items into a thermally protected container and delivering the container to a customer along a flexible guideway.

BACKGROUND OF THE INVENTION

Online shopping is increasingly important in a society that must practice social distancing and desires delivery of perishable goods that are refrigerated. Current methods are to have local grocery stores use human staff to hand select ordered items and deliver them to the customer, again carrying them by hand and placing them at the customer's doorstep. This does not solve the problem of virus transmission from the employee to the customer or provide an acceptable ease of use for the consumer.

SUMMARY OF THE INVENTION

The present invention solves the problems described above by providing a method of selling goods to a customer. The method may be performed by a processor of an automated delivery system. The method may include causing loading of a variety of goods into a plurality of dispenser robots, and receiving an order for goods from a customer over a communications network via a user device (e.g., customer user device). The method may further include causing a delivery vehicle to move along a guideway to at least one location of at least one dispenser robot of the plurality of dispenser robots responsive to receiving the order. The method may additionally include causing dispensing of goods from the at least one dispenser robot into the delivery vehicle, and causing the delivery vehicle to load onto an aerial tramway responsive to causing dispensing of the goods. Furthermore, the method may include causing the delivery vehicle to move to a destination point on the aerial tramway, and presenting the goods in the delivery vehicle to the customer at the destination point. In some aspects, the processor may transmit a notification to the user device to collect the goods from the delivery vehicle at the destination point.

In an embodiment, causing the delivery vehicle to move along the guideway may include propelling a push object along the guideway, moving the delivery vehicle along the guideway by bringing the push object into contact with the delivery vehicle and pushing the delivery vehicle to a desired location along the guideway.

In another embodiment, causing the delivery vehicle to move along the guideway may include engaging with a bicycle wheel turbine electricity generator as the delivery vehicle travels along the guideway.

In an embodiment, causing dispensing of goods may include inserting goods into a vacuum container located in the delivery vehicle.

In another embodiment, causing dispensing of goods may include inserting goods into a temperature-controlled portion of the delivery vehicle. In some aspects, the method further includes transmitting instructions to the customer to arrange reusable vacuum containers or bags within the customer container.

In another aspect, the present invention provides a system for distribution of goods from a storage facility to a customer. The system may include a delivery vehicle having a storage area for items purchased by a customer, and a dispensing robot configured to controllably dispense goods into the storage area on the delivery vehicle. The system may further include a guideway on which the delivery vehicle travels and an aerial tramway along which the delivery vehicle is carried. The system may additionally include a pier elevator that may be configured to move one or more customer containers vertically between the guideway and the tramway or between a customer and either the guideway or the tramway.

In an embodiment, the pier elevator may include a robotic clamping mechanism configured to grasp the delivery vehicle.

In an embodiment, the guideway may be flexible and may include a plurality of solid guideway segments that may be connected lengthwise by flexible ball and socket connections.

In an embodiment, the system may include a plurality of dispensing robots. In certain embodiments, the plurality of dispensing robots may dispense respective item types into the delivery vehicle. The plurality of dispensing robots may include the dispensing robot described above.

In an embodiment, the delivery vehicle may include a customer container that may be located within the storage area in the delivery vehicle.

In an embodiment, the customer container may be cylindrical in shape and may include an autonomously rotating axle disposed within the center of the customer container to which a plurality of rings of vacuum containers or vacuum bags may be attached.

In an embodiment, the delivery vehicle and the customer container may include sliders that attach to the autonomously rotating axle and enable the vacuum container to slide along a length of the autonomously rotating axle.

In an embodiment, the delivery vehicle may further include a plurality of controllably closeable loops or clamps that connect the delivery vehicle to the aerial tramway.

In an embodiment, the guideway may include a plurality of guideway electricity generators including bicycle wheel wind turbine generators configured to generate electricity as the delivery vehicle travels along the guideway and from wind currents.

In an embodiment, the guideway electricity generators may further include rotors, stators, and exciters. The rotors may be constructed of a series of electromagnets positioned inside of the stators.

In an embodiment, the tramway may include a gripping device configured to place one or more delivery vehicles on the tramway and remove the delivery vehicles from the tramway.

In an embodiment, the dispensing robot may include clamping members and shutters configured to controllably dispense items from the dispensing robot into the delivery vehicle.

Many other features and advantages will be apparent to one skilled in the art upon reading the following detailed description, when considered in conjunction with the accompanying drawings.

BRIEF DESCRIPTION OF THE DRAWINGS

FIG. 4 illustrates a preordering process by a customer.

DETAILED DESCRIPTION OF THE INVENTION

Figure 1:
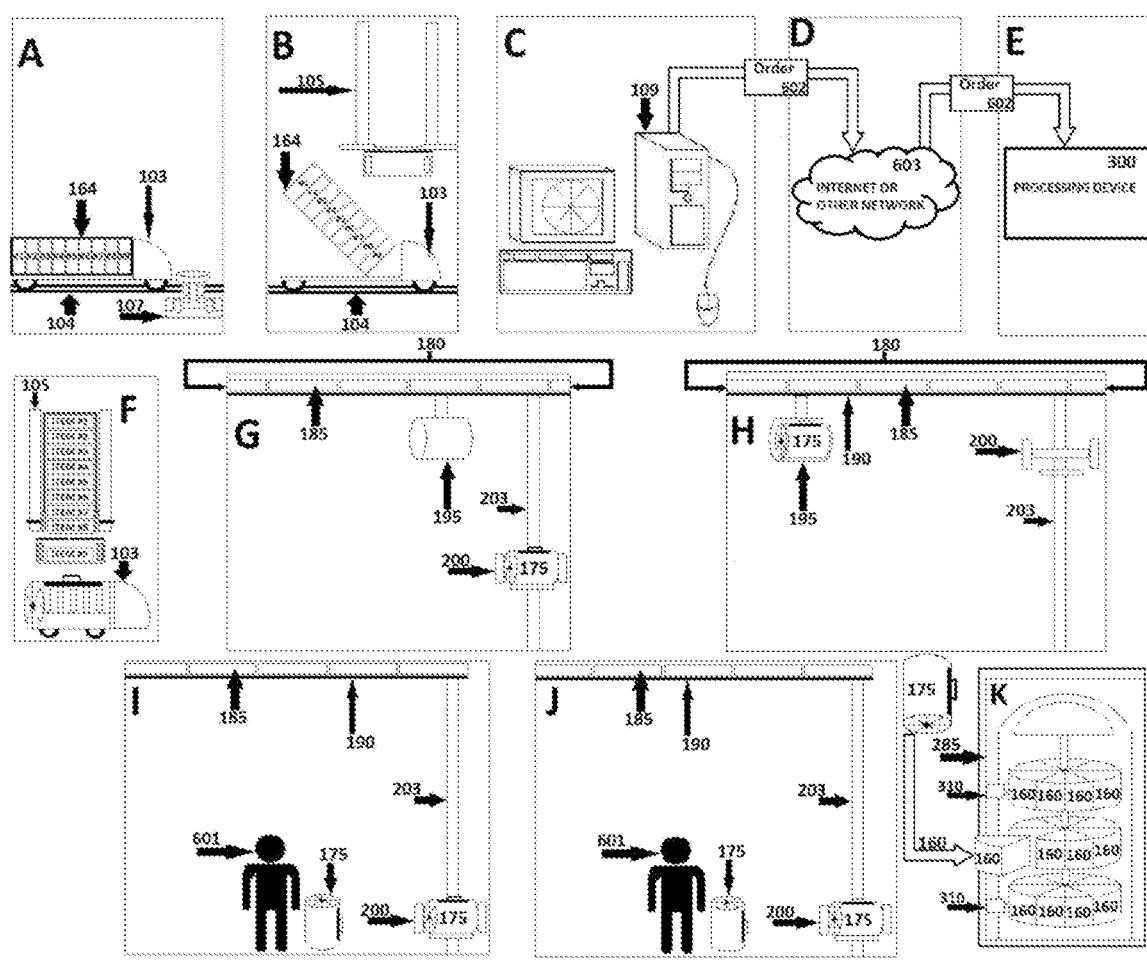
FIG. 1 illustrates a working overview of an automated delivery system.

Directing attention to FIG. 1 that illustrates a working overview of an automated delivery system. The automated delivery system may include a delivery vehicle 103, as depicted in portion A of FIG. 1. The delivery vehicle 103 may be communicatively coupled to a processor 300 (or processing unit 300, shown in FIG. 9) via a network 603. The processor 300 may be a part of a computing environment 1200, shown in FIG. 12. The delivery vehicle 103 may move along a guideway 104, based on instructions by the processor 300. The delivery vehicle 103 may be configured to carry a thermally-insulated dispensing unit 164 (or dispensing unit 164). The dispensing unit 164 may be filled with market goods/items, and may be covered in a thermal material which helps keep market goods at a proper temperature and saves energy. The delivery vehicle 103 may include a push object (shown as push object 140 in FIG. 2) that may be in contact with and rubbing against a wheel of a bicycle wind turbine (shown as bicycle wind turbine 115 in FIG. 2) of a guideway generator 107 that may be configured to generate electricity. The details of the guideway generator 107 and the push object are described later in the description below in conjunction with FIG. 2.

As shown in portion B of FIG. 1, in an embodiment, the delivery vehicle 103 may be configured to carry the thermally-insulated dispensing unit 164 into a placer robot 105. Robotic mechanisms attached to and/or disposed near the delivery vehicle 103 and/or a dispenser robot may autonomously move (e.g., based on the instructions from the processor 300) the dispensing unit 164 from the delivery vehicle 103, and then attach the dispensing unit 164 to the rest of the placer robot 105. In some aspects, the delivery vehicle 103 carrying the goods may move towards the placer robot 105 and move the goods to the placer robot 105 via the robotic mechanism based on a first input (e.g., a first trigger signal from the processor 300). In other aspects, the placer robot 105 may receive goods from the delivery vehicle 103, via robotic mechanism attached to the placer robot 105 based on a second input (e.g., a second trigger signal from the processor 300). The details of the placer robot 105 and the dispensing unit 164 may be understood in conjunction with the description of FIG. 3.

Figure 8:
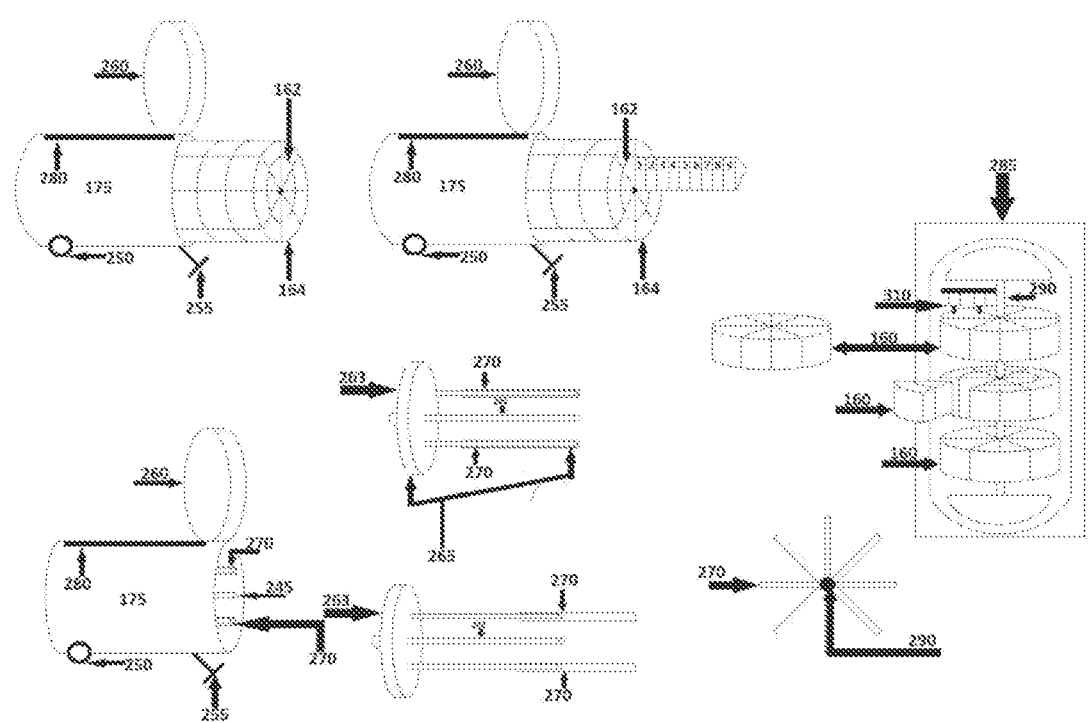
FIG. 8 illustrates a cylinder shaped customer container.

As shown in portion C of FIG. 1, a set of human-readable container configuration instructions may be displayed to the customer on a monitor screen (e.g., a monitor screen 170 shown in FIG. 5 or any other user interface/device), which may be communicatively coupled to the processor 300, and may provide/transmit instructions to the customer based on inputs from the processor 300. Specifically, the processor 300 may transmit instructions to the customer, via the user device, instructing the customer how to arrange reusable vacuum containers or bags (that may be retrieved from a previous order) within a customer container 175, disposed in the delivery vehicle 103 (shown in portion F of FIG. 1). The customer container 175 may include a rotating axle or autonomously rotating and locking horizontal axle (e.g., a rotating axle 245 on which a ring of vacuum containers or bags may be attached, as shown in FIG. 8), and sliders (e.g., sliders 270 shown in FIG. 8) that may be attached to the rotating axle and may slide forward or backward. In some aspects, the instructions may instruct the customer to arrange the reusable vacuum containers or bags around the rotating axle located within the customer container 175. In some aspects, the reusable vacuum containers or bags may be attached to the sliders. The details of arranging the reusable vacuum containers or bags may be understood in conjunction with the description of FIG. 5, and the details of the customer container 175 may be understood in conjunction with the description of FIG. 8.

Continuing to portions C-F of FIG. 1, a customer 601 may use an electronic communications device 109 (such as a personal computer or any other user device) and place a customer order 602 (that consists of at least one market item/good) via a communications network 603 such as the internet or any other network. In some aspects, the customer 601 may place the customer order 602 in advance. The customer order 602 or digital information associated with the customer order 602 may be sent to the processor 300 via the communications network 603. The processor 300 may receive the information associated with the customer order 602, analyze the information, and may transmit a request to the placer robot 105 to dispense goods indicated in the customer order 602 to an autonomous delivery vehicle 103 (e.g., another delivery vehicle), as shown in portion F of FIG. 1. In addition, the processor 300 may transmit instruction (based on the customer order 602) to the delivery vehicle 103 to move over the guideway 104 towards the placer robot 105 to receive the goods from the placer robot 105. In some aspects, the processor 300 may render an order screen on the user device (or the electronic communications device 109) to receive the customer order 602.

Specifically, the customer order 602 or the digital information may be sent from the processor 300 to at least the placer robot 105. The placer robot 105 may be configured to receive the customer order 602 or the digital information, and may dispense/place at least one item to/in the delivery vehicle 103. Stated another way, the placer robot 105 may be configured to place the at least one item in the autonomous delivery vehicle 103 when the customer 601 places the customer order 602. The autonomous delivery vehicle 103 may include the customer container 175. In some aspects, the placer robot 105 may be configured to place the at least one item (based on the customer order 602) into a vacuum container 160 or vacuum bag that may be attached to the rotating axle of the customer container 175 (e.g., when the autonomous delivery vehicle 103 arrives in proximity to the placer robot 105). In some aspects, the processor 300 may transmit a trigger signal to the placer robot 105 to dispense the goods associated with the customer order when the autonomous delivery vehicle 103 arrives in proximity to the placer robot 105.

As shown in portion G of FIG. 1, the delivery vehicle 103 having the customer container 175 (which may include the items loaded in the vacuum containers 160 or bags that the customer 601 ordered over the communications network 603)) moves on the guideway 104 towards a miniature elevator, which may be a pier elevator 200 (e.g., based on inputs/instructions from the processor 300). The pier elevator 200 may have an attached robotic clamping mechanism that takes the customer container 175 out of the delivery vehicle 103 and carries it up a pier 203. In some aspects, the pier elevator 200 takes the customer container 175 and the items loaded within the vacuum container 160 up to an aerial tramway cable vehicle 195 (e.g., based on the inputs/ instructions from the processor 300). Specifically, the robotic clamping mechanism of the pier elevator 200 grasps the customer container 175 and places it into the aerial tramway cable vehicle 195 or moves the customer container 175 from the pier elevator 200 to the aerial tramway cable vehicle 195.

As shown in portion H of FIG. 1, the aerial tramway cable vehicle 195 may be moved by a moving cable that makes up the aerial tramway 190, based on inputs/instructions from the processor 300. In some aspects, the aerial tramway 190 may be underneath or in a groove of a flexible guideway track 180. The aerial tramway cable vehicle 195, with the customer container 175, may move to a drop off location where the customer container 175, and the contents within the vacuum containers 160, may be taken out of the aerial tramway vehicle 195 (e.g., based on inputs/instructions from the processor 300). In some aspects, the robotic clamping mechanism of the pier elevator 200 may take out the contents/items of the vacuum container 160 or the customer container 175.

As shown in portions I and J of FIG. 1, the robotic clamping mechanism of the pier elevator 200 may take the customer container 175 out of the aerial tramway vehicle 195 (or the delivery vehicle 103) and then lowers down the customer container 175 to the customer 601 waiting below (e.g., on the ground), based on inputs/instructions from the processor 300. In some aspects, the processor 300 may transmit a notification to the customer 601 via the user device (or the electronic communications device 109) to collect the goods from the customer container 175, at the destination point.

At portion J of FIG. 1, the customer 601 may place the empty customer container that was ordered from a previous order onto the pier elevator 200, which may be taken up the post to the overhead tramway vehicle 195. In one embodiment, the customer container 175 may also contain empty vacuum containers and/or bags that were obtained from a previous order and may be taken to a location to be washed if they weren't washed already so that they can be reused. In one embodiment, the same customer will reuse the same vacuum containers that were obtained from a previous order after they have been washed.

At portion K of FIG. 1, the customer 601 may take the vacuum containers 160 or bags that may be filled with ordered goods out of the customer container 175, and then attach them to the sliders that may be attached to the rotating axle within an energy efficient circular refrigerator 285. The inside of the circular refrigerator 285 may be similar to the inside of the customer container 175 with an automatically rotating axle that may be powered by a motor or other robotic mechanisms.

Figure 2:
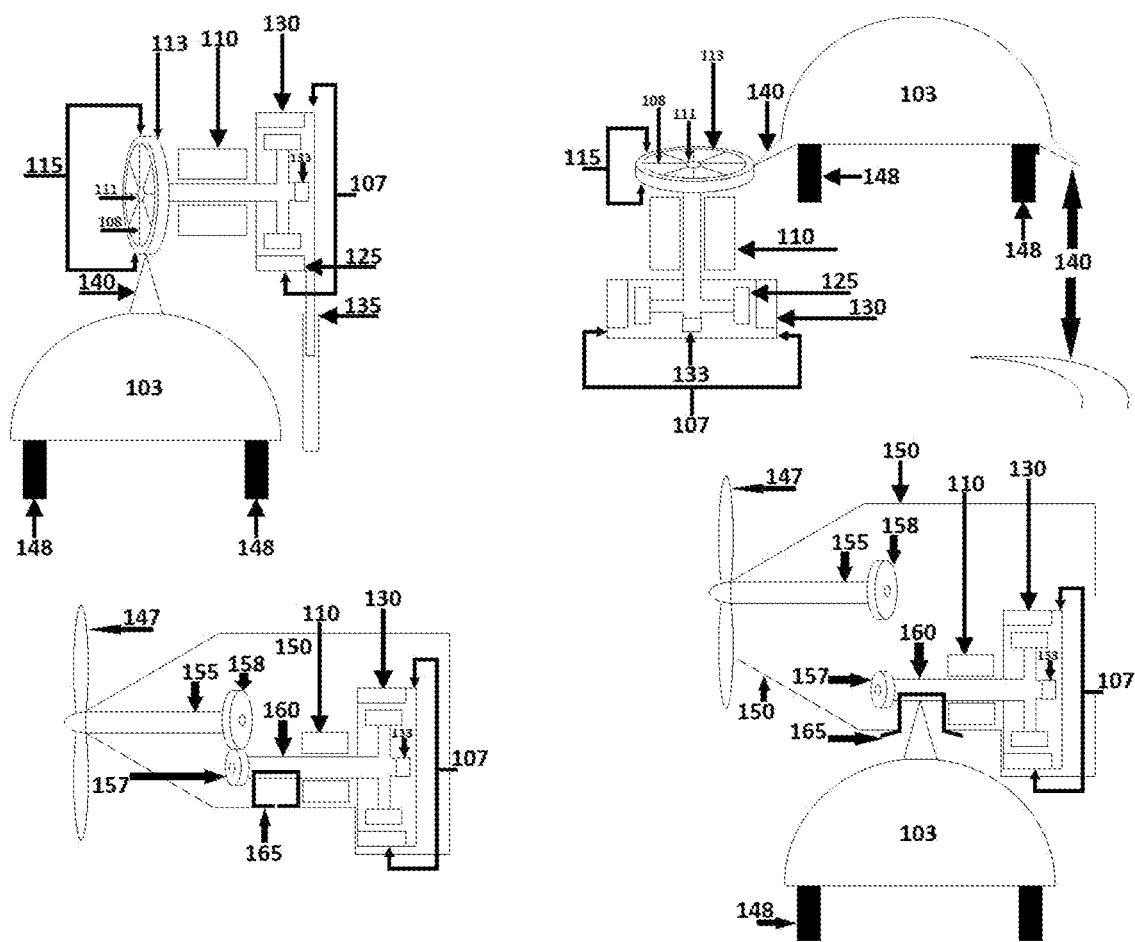
FIG. 2 illustrates electric generators powered by both a delivery vehicle and flowing wind currents.

FIG. 2 illustrates an embodiment of the present invention in which electric generators, referred to herein as guide way generators 107, may be powered by both the movement of the delivery vehicle 103 and its attached push object 140 as well as flowing wind currents. The guideway generators 107 may be mounted on vertical or horizontal axles 110 and may be positioned alongside the guideways 104. The guideway generators 107 may be objects composed of bicycle wheel wind turbines 115, rotors 125, stators 130 and exciters 133. The rotors 125 may be constructed of a series of electro-magnets that are positioned inside of a stator 130.

The axle 110 extends from the middle portion of the bicycle wheel wind turbine 115 from one end. The rotor 125 may be attached to the axle 110 at the opposite end of the axle 110 that may be connected to the bicycle wheel wind turbine 115. The rotor 125 may be inside the stator 130, and the rotor 125 and the stator 130 combine may form the guideway generator 107. In an alternative embodiment, the guideway generators 107 may include a gear or wheel instead of the bicycle wheel wind turbine 115. As the delivery vehicle 103 moves forward, its push object 140 rubs against the gear or wheel, which causes the gear to turn and power the guideway generator 107 to produce electricity.

In some aspects, as the delivery vehicle 103 moves forward, its push object 140 rubs against the outer curved surface of a bicycle wind turbines outer ring 113, which causes the bicycle wheel wind turbine 115 to turn and power the guideway generator 107 in order to produce electricity. A delivery vehicle with a push object 140 that rubs against a bicycle wind turbine 115 may move along guideway tracks 104 in accordance to an embodiment.

The bicycle wind turbine 115 illustrated within FIG. 2 consists of a turbine ring 113, a center object 111 and turbine blades 108 that interconnect with each other in order to form the bicycle wheel wind turbine 115 in its entirety. The turbine ring 113 of the bicycle wheel wind turbine 115 surrounds the center object 111 which has a ring of turbine blades 108 that extend outward from its outer surface to the inner curved surface of the turbine ring 113. One end of each blade is attached to the center object 111, and the opposite end of each turbine blade 108 is attached to the inner curved surface of the turbine ring 113.

The center object 111 may be an axle, an object attached to an axle which also rotates along with the axle it's attached to, or an object that rotates around an axle. In one of many possible embodiments, there may be a ring of gear teeth that may be attached to the outer circumference of the turbine ring 113. In an alternative embodiment, a high speed or low speed axle of a bicycle wheel wind turbine 115 may have a ring of gear teeth around its circumference.

In an alternative embodiment, the guideway generator 107 and bicycle wheel wind turbine 115 may be located at or near the tip of an extendable pole 135. The extendable pole 135 may be able to extend in the same manner like an umbrella pole extends or a set of television rabbit ears extend. The extendable pole 135 may also be able to lower its top surface by tilting down so that it may be positioned at an angle relative to its elongated member. This allows the delivery vehicle 103's push object 140 to come into contact with the bicycle wheel wind turbine 115. When the pole 135 swings back up, the bicycle wind turbine 115 may be too high or far away for the delivery vehicle 103's push object 140 to make contact. The push object 140 may be constructed into the shape of a triangle, a rectangle, half circle, shark fin, in a shape of an automobile vortex generator or any other suitable shape. In one embodiment, there may be gear teeth of any size attached to the surface of the push object 140. The delivery vehicle 103's push object 140 may be able to retract in a downward motion, left or right motion, or left or right diagonal motion when it comes into contact with the bicycle wheel wind turbine 115.

In another embodiment, a vehicles roof wracks may also function as its push object. If this is the case, then the roof racks of a vehicle will function both as objects that allow objects to be tied to the roof of a vehicle as well contact objects. There may be at least one spring and/or suitable mechanical object attached to the push object 140 in order to enable the push object 140 to retract.

Roof Groove

In one embodiment, there may be a groove called a vehicle groove (not shown) located on the roof and/or other outer surface of the delivery vehicle 103. A turbine or outer ring 113 of the bicycle wheel wind turbine 115 can extend in between the walls of the groove as the delivery vehicle 103 moves underneath it. The forward movement of the delivery vehicle 103 may turn the bicycle wheel wind turbine 115 and generate power as the turbine or wheel rubs the inner surface of the vehicle groove. A push object 140 vehicle groove or a delivery vehicle roof can retract and/or tilt at least partially, into and extend and/or tilt outward from the object it's attached to. For example, the push object 140 that is attached to the roof of the delivery vehicle 103 may retract and/or tilt deeper into the delivery vehicle's roof as it comes into contact with the bicycle wheel wind turbine 115, or axle. The delivery vehicle's roof mounted contact object will extend upward when not in contact with a turbine, axle, or other object.

Any suitable mechanical object, or combination of mechanical objects such as springs, hinges, robotic arms, or other robotic objects may be used to allow for a push object 110-140, vehicle groove, or delivery vehicle roof to tilt and/or extend and retract. In one embodiment, a push object 110-140, vehicle groove, or delivery vehicle roof can retract and/or tilt using electronic means. Any movement of the push object 110-140, vehicle groove, or delivery vehicle roof can be achieved automatically and or through human intervention using other electronic devices such as remote controls and/or push buttons.

The bicycle wheel wind turbine 115 may be turned by the movement of a delivery vehicle 103 and the attached push object 140 or by the movement of wind currents. Any suitable type of wind turbine may be used to power the guideway generator 107. If the bicycle wheel wind turbine 115 is used to exploit the movement of moving vehicles and wind currents to generate energy, then it may have 2 blades, 3 blades, 5 blades, 9 blades, 10 blades, 14 blades, or any number of suitable blades.

The outer ring 113 that forms the bicycle wheel wind turbine 115 may have a ring with holes of any suitable shape, and/or nozzles, and/or oval shaped slots, and/or rectangular shaped slots, and/or oval shaped nozzles, and/or rectangular shaped nozzles, and/or guide vanes that form openings that extend through the outer surface of the bicycle wind turbines ring in order to form an opening that directs wind currents to the blades 108 of the bicycle wheel wind turbine 115. The holes or nozzles around the bicycle wind turbines outer ring 113 may be vertical horizontal or diagonally. In an alternative embodiment, gear, wheel, or axle takes the place of the bicycle wheel wind turbine 115.

Slow Down-Save on Energy Braking

In one embodiment, the bicycle wheel wind turbine 115 may serve to slow down the delivery vehicle 103 as the contact object 110-140 of the delivery vehicle 103 comes into contact with the outer curved surface of the bicycle wind turbines 115 outer ring 113. This may be desirable when the vehicle needs to slow down such as when the delivery vehicle 103 needs to slow down just before making a turn. This will reduce the amount of energy used to stop the delivery vehicle 103.

Turbine Tilts

In one embodiment, the bicycle wheel wind turbine 115, and/or the unit that houses the electric generator 107, and/or the axle, and/or the pole and/or any other attached object that connects the entire interconnected guideway generator unit together can retract and/or tilt at least partially, into and extend and/or tilt outward from the object or ground it's attached to. Any suitable mechanical object, or combination of mechanical objects such as springs, hinges, robotic arms, or other robotic objects may be used to allow for bicycle wheel wind turbine 115, and/or unit that houses the electric generator 107, and/or axle, and/or pole and/or any other attached object that connects the entire interconnected guide way generator unit together to tilt and/or extend and retract. In one embodiment, the bicycle wheel wind turbine 115, and/or the unit that houses the electric generator 107, and/or the axle, and/or the pole and/or any other attached object that connects the entire interconnected guideway generator unit together to extend and retract or tilt can be achieved automatically and or through human intervention using other electronic devices such as remote controls and/or push buttons.

Turbine Detachment

In an alternative embodiment, a rotating axle may be able to mechanically attach and detach from the bicycle wheel wind turbine 115. If this is the case, then in one embodiment, there may be an inner ring surrounded by attached turbine blades 108. The inner ring may be attached by solid pins and/or other objects to the rotating axle. The solid pins and/or other objects may extend from the rotating axle and attach to the inner curved surface of the inner ring and/or vice versa. One way the solid pins and/or other objects may attach the rotating axle and inner ring to each other is by extending from the rotating axle into and interlocking with holes or openings on the inner surface of the inner ring and/or vice versa.

3 Bladed Turbine

In an alternative embodiment, the movement of delivery vehicles and wind currents may rotate the axle of a 3 bladed wind turbine which is structured much like a common 3 bladed wind turbine instead of a bicycle wind turbine or other turbine. A common 3 bladed wind turbine has 3 blades that extend from the outer surface of a rounded object. The rounded object is attached in the center of the 3 blades. This type of wind turbine enables powering of both high speed and low speed shafts 155 or axles much like a common 3-bladed wind turbine 147. In some aspects, it may be possible for a top portion of a gearbox 150 to separate from and be raised off of a bottom portion of the gearbox 150 so that a gear 157 of a high-speed bottom shaft 159 is no longer in contact with a gear 158 of the bottom low speed top shaft 155. When the high speed and low speed shafts are separated, it may enable the push object 140 of the delivery vehicle 103 to rub against the bottom highspeed shaft 159 from below, which may make it turn and power the guideway generator 107 so that electricity may be generated. Extendable robotic arms and/or rods may raise and support the top of the gearbox 150 and the attached top low speed shaft 155 of the wind turbine, when it is time for the top low speed shaft 155 to be separated from the bottom high-speed shaft 159 or axle. There may be at least one shutter 165 or sliding door on the gear box below the high-speed shaft 159 which opens up the bottom high-speed shaft 159 to the push object 140 of the delivery vehicle 103 so that the push object 140 may rub against the axle 110 which powers the guideway generator 107 and generates electricity.

The 3-bladed wind turbine may be powered by wind to generate electricity by lowering the top of its gear box so that the gears of the low speed shaft 155 and high speed shaft 159 may be in physical contact with each other. In one embodiment, an axle, high speed shaft 159 or low speed shaft 155 may have a ring of gear teeth around its circumference. In one embodiment, there may be an arch positioned over the top of the blades of a turbine. The arch will not be attached to the turbine. The arch may have openings and/or nozzles that resemble the openings or nozzles described above. The openings or nozzles will direct air currents to the turbine. Poles and/or other solid objects that are attached to the arch will firmly attach it to the ground and/or some other solid object. In one embodiment, there may be a ring that will surround the blades of a turbine. The ring will not be attached to the turbine. The arch may have openings and/or nozzles that resemble the openings or nozzles described above. The openings or nozzles will direct air currents to the turbine. Poles and/or other solid objects that are attached to the ring will firmly attach it to the ground and/or some other solid object.

A computer enabled communications network such as the internet, WAN wide area network, LAN land area network, MAN metropolitan area network, or any other suitable communications network may be used to analyze wind speeds and direction as well as traffic flow in order to decide whether or not to raise or lower the wind turbine.

Electrical production from the guideway generators 107 may be easier to produce at a desired time than renewable resources such as solar or wind because vehicles may be programed to power the guideway generators 107 when it may be most desired. The guideway generators 107 may be placed in areas where it is necessary for vehicles to brake, such as when traveling along off ramps. Electricity produced from the guideway generators 107 may help the automated delivery infrastructure to pay for itself.

Speed Lanes

In one embodiment, there may be multiple lanes that permit a guideway directed delivery 103 to travel at different speeds. For example, there may be a fast lane where delivery vehicles are only allowed to travel fast. A fast lane may have no turbines or guideway generators. There may be a fast lane where delivery vehicles 103 are only allowed to travel at a relatively moderate speed. A mid speed lane may be equipped with smaller and lighter turbines and guideway generators. A delivery vehicle 103 may move into a mid-speed lane shortly before it moves into an exit lane or slow lane. Finally, there may be a slow lane where the delivery vehicles 103 are only allowed to travel at a relatively slow speed. A slow speed lane may be equipped with larger and heavier turbines and guideway generators. A delivery vehicle 103 may move into a slow-speed lane shortly before it makes a turn, exits a guideway, or transitions from one guideway 104 to another.

Figure 3:
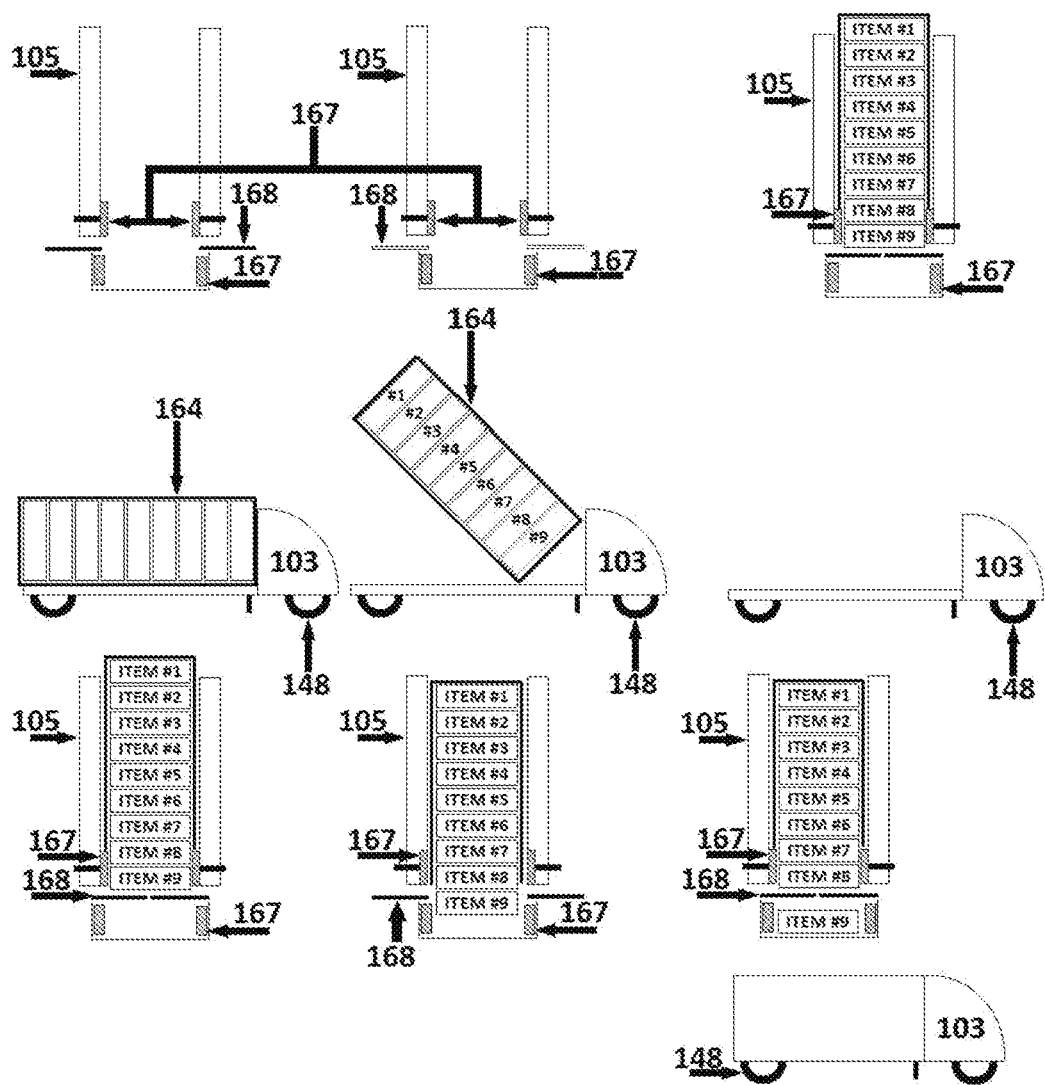
FIG. 3 illustrates a process of dispensing item(s) from placer robot(s) by identifying a location of the delivery vehicle.

FIG. 3 illustrates a process of dispensing item(s) from placer robot(s) 105 on the autonomous delivery vehicle 103 by identifying the location of the autonomous delivery vehicle 103. FIG. 3 also illustrates how a delivery vehicle can attach a dispensing unit 164 to the dispenser robot 105. In one embodiment, hinges may tilt the robotic dispensing unit upward. In such cases, hinges attached to the delivery vehicle 103 and/or dispensing unit 164 may allow the dispensing unit 164 to tilt. Specifically, FIG. 3 illustrates the autonomous delivery vehicle 103 that may be directed along the guideway track 104, based on the inputs/instructions of the processor 300 FIG. 3 may be described in conjunction with FIG. 8. As described above, the autonomous delivery vehicle 103 (as shown in portion F of FIG. 1) may have a cargo transporting vessel 175 (same as the customer container 175 shown in FIG. 1) attached to the back portion of the autonomous delivery vehicle 103. The cargo vessel 175 may be filled with market goods. In an embodiment, the attached cargo vessel 175 may be shaped like a cylinder. In another embodiment, the cargo vessel 175 may rotate on at least one short axle that may be attached to the back of its outer surface and/or the autonomous delivery vehicle 103. The autonomous delivery vehicle 103 may be equipped with at least one wheel 148.

In an alternative embodiment, horizontally-positioned, autonomously-rotating axle 245 may be attached inside of the cargo vessel 175 (as depicted in FIG. 8). The axle 245 extends downward along the cargo vessel 175 length at the center. Objects may be attached to the axle 245, which may allow the vacuum containers 160 or bags to be attached. The axle 245 may autonomously lock into place so that it may not rotate, as well as controllably unlock so it may rotate again.

In an embodiment, drawer sliders 270 (as shown in FIG. 8) may be attached to objects that may be connected to the axle 245 that may allow a row that makes up a ring of the vacuum containers 160 or bags to slide into or out of the delivery vehicle 103 in much the same way a drawer slides in and out of a kitchen counter. Mechanical mechanisms located within the delivery vehicle 103 and/or attached near to a dispenser robot mechanically operate the sliders 270 and the attached vacuum containers 160 back and forth. This operation enables the placer robot 105 to place items into the vacuum container 160 or a vacuum bag located within the cargo vessel 175 on the delivery vehicle 103.

In an alternative embodiment, the axle 245 may extend from the center flat surface of a rotating slider plate. The rotating slider plate may include attached bars 162 that extend from the face surface of a flat wheel 263 that rotates on a short axle (as shown in FIG. 8). Sliders that resemble drawer sliders may be attached to the horizontally extending bars 162. In an embodiment, the slider plate may be detachable from the back inner wall of the cargo vessel 175. In an embodiment, the cargo vessel 175 may detach from the autonomous delivery vehicle 103. A dispensing unit of the placer robot 105 may be attached to the delivery vehicle 103 after the cargo vessel 175 may be detached. In an embodiment, there may be wheels attached to the sliders. The delivery vehicle 103 may be the size of a shopping cart or smaller. The delivery vehicle 103 may configured to move along the low rolling resistance guideway track 104 to improve energy efficiency (similar to the delivery vehicle 103 shown in portion A and B of FIG. 1).

In some aspects, the delivery vehicle 103 may signal to the placer robot 105 to place an item into the delivery vehicle 103, or the vacuum container 160 located in the delivery vehicle 103. In an embodiment, the delivery vehicle 103 may instruct the placer robot 105 to pull out containers located on sliders located on the delivery vehicle 103 to place the item. In an alternative embodiment, the delivery vehicle 103 may signal the placer robot 105 to place the item into the delivery vehicle 103, or the vacuum container 160 located in the delivery vehicle 103 and signal the placer robot 105 to pull out a drawer located in the delivery vehicle 103. The delivery vehicle 103 may be programmed to signal the placer robot 105 after it may have passed a number of count objects.

FIG. 3 further illustrates the delivery vehicle 103 carrying the thermally-insulated dispensing unit 164 of the dispenser robot 105 or the placer robot 105. The thermally insulated dispensing unit 164 of the placer robot 105 is covered with a thermal material which may keep the market goods stored within the desired temperature and save energy. As described above, robotic mechanisms may be attached to and/or near the delivery vehicle 103 and/or to the placer robot 105 that may move the dispensing unit 164 from the delivery vehicle 103, and then attach it to the rest of the placer robot 105. There may be at least one shutter or autonomously opening and closing door on the dispensing unit 164.

The thermal dispensing unit 164 may have a variety of product handling contraptions such as robotic clamps, hands, arms, nozzles or any other suitable device or combination of devices attached to and/or near its lower surface. Product handling contraptions 167 may be used to grab items dispensed from the placer robots 105 to the dispensing unit 164, and place them into the delivery vehicle 103 and/or into the vacuum container 160 or vacuum bag located in or within the delivery vehicle 103. Such items may include, but are not limited to, bread, meat, cereal, ice cream, cheese, produce items such as apples or oranges, granular products such as dog food, or liquid items such as soda or water. There may be a thermal material that covers at least a portion of the outer surface of the placer robot 105 which may keep the items stored within an ideal warm or cool temperature.

Any number or combination of suitable mechanical mechanisms attached to a dispenser robot 105 and/or delivery vehicle 103 may lift the dispensing unit 164 from the delivery vehicle 103 and attach it to the dispenser robot 105 (or the placer robot 105). Such mechanisms include but are not limited to robotic clamping mechanisms, motors, wheels, rollers, springs, hinges shutters, actuators, robotic, arms, robotic hands, or any other specific mechanical mechanism or suitable mechanical mechanisms.

In one embodiment, a contraption resembling a box with a missing bottom may lift the dispensing unit 164 containing market goods into its body. In another embodiment, the box with a missing bottom will have one or two of its side walls that are across from each other missing. At least one mechanical mechanism may tilt and/or lift the dispensing unit 164 in between the walls of the box, and then the dispensing unit 164 may be secured into place.

Any number or combination of suitable mechanical mechanisms attached to a dispenser robot 105 and/or delivery vehicle 103 may be attached on the inner walls of the box. Such mechanical mechanisms include, but are not limited to, robotic clamping mechanisms, motors, wheels, rollers, springs, hinges shutters, actuators, robotic, arms, robotic hands, or any other specific mechanical mechanism or suitable mechanical mechanisms.

A thermal dispenser robot 105 or the placer robot 105 may be constructed into suitable shapes, including but not limited to, rectangle shaped, cylinder shaped, or disk shaped. In some aspects, the product handling contraptions 167 or the clamping members 167 may include two solid objects such as plates. The clamping members 167 may be positioned across each other (e.g., on opposite edges of the placer robot bottom portion) such that a predetermined distance may exist between the plates. The plates may be controllably moved closer in a clamping motion to receive and/or release items from the placer robot 105 to the delivery vehicle 103. In some aspects, the placer robot 105 may include shutter doors 168 below the clamping members 167, which may open or close in a controlled manner. In an embodiment, there may be a basket that may have attached robotic mechanisms to grasp items that drop down inside of it. The bottom item (e.g., Item #9 within the dispensing unit 164) may drop down into a mechanical placing contraption that may be attached to and/or near the bottom of the dispensing unit 164, and then the placer robots 105 or mechanical placing contraption may place the Item #9 into the delivery vehicle 103 or into the vacuum container 160 or vacuum bag located within the delivery vehicle 103.

Clamping Dispenser Robot

FIG. 3 further illustrates an embodiment of the placer robot 105, which is described above.

Wheel Dispenser Robot

The present disclosure also describes a wheel dispenser robot embodiment, which may be a type of dispenser robot that includes a rounded storage unit and may be configured to store retail items. The wheel dispenser robot may include a ring of slots and/or tubes that surround an axle. Items may be placed within the slots or tubes, and the tubes may be sealed up and air within may be vacuumed out to keep items fresh. When the axle rotates, the opening of the tube may face the opening of the delivery vehicle 103 or the vacuum container 160 located in the delivery vehicle 103. One or more mechanical devices attached to and/or near the wheel dispenser robot may capture an item as it falls or slides out of the tube located on the wheel dispenser robot, or a plurality of items as they fall or slide out of the tube located on the wheel dispenser robot.

Mechanical devices used to capture falling and/or sliding items may include, but are not limited to, robotic arms, wheels, gears, actuators, springs, clamps, or any specific robotic device that is suitable, or a plurality of robotic devices that may be suitable. Any mechanical device that captures items exiting a wheel of a dispenser robot will most likely be located at and/or near an opening where an item may be released from the wheel dispenser robot.

Objects such as plates or pins may retract back and forth at and/or near the opening of the tube to prevent extra items from falling outside of the tube. In an embodiment, the retracting objects that prevent items from falling out of the tubes may extend and retract like a switch blade knife extends from its handle and retracts back into its handle. Springs, and/or wheels, and/or actuators, and/or gears, and/ worm gears, or shutters that swing open and closed may also be used to extend the objects that prevent items from falling out of the tubes.

Suitable shapes for tubes include, but are not limited to, round, oval, hexagon, square, rectangle, triangle, or any other suitable shape. The tubes and the axle may be located within a circular shaped container in accordance with an embodiment of the present disclosure. In an alternative embodiment, one or more mechanical devices lift items upwards out of the wheel dispenser robot. In an alternative embodiment, the wheel dispenser robot may have a tube filled with a specific item, and another tube filled with a different item. It may also be possible for multiple tubes of the wheel dispenser robot to dispense items at the same time.

In another alternative embodiment, one mechanical device, or a plurality of mechanical devices, may lift items upwards out of the wheel dispenser robot.

In an embodiment, the wheel dispenser robot may fill up its dispensing unit by moving close to a manufacturing or processing machine such as a conveyor that may be releasing a manufactured product. Then one or more robotic devices located on or near the wheel dispenser robot or located on or near the machine that may be releasing the manufactured product, grabs a product that is being released by the manufacturing or processing machine and places it into the dispensing unit of the wheel dispenser robot.

The wheel dispenser robot may rotate on either a horizontal or a vertical axle. In an embodiment, the wheel dispenser robot may be located within a circular-shaped container and its tubes or bars that may be attached to the axle extends and almost touches the inner curved wall. The circular-shaped container may have tubes or bars that may be located within the circular-shaped container and may remain stationary and do not rotate. The axle and the ring of tubes or boards attached to the axle may rotate within the stationary circular container. Items within the tubes may not fall out of the wheel dispenser robot because they will be trapped between the bottom side and the top walls of the tube and the tube's opening may be closed to the inner curved wall of the circular container so there may not be enough space for the items within to fall out. Further, the items blocked by boards may not fall out of the circular dispenser robot because they may be blocked by the side walls of the circular container, the inner curved wall of the circular container and the two boards that they may be sandwiched in between. In an embodiment, the tip ends opposite of the tip ends of the tubes or boards are attached to the axle circle around, until they face an exit that may be blocked by a set of robotic doors, shutters, plates, pins, or bars referred to herein as an exit module. The robotic doors, shutters, plates, bars, or pins may open and/or retract automatically, allowing at least one item located within the wheel dispenser robot to fall out of it.

Additional items located within the wheel dispenser robot may be prevented from falling out by another robot referred to herein as a hold module that may include robotic doors, shutters, plates, pins or bars that may close and/or extend to prevent additional items from falling out of the tube of the wheel dispenser robot. The tubes of the wheel dispenser robot may have slots or holes near their tip ends that may be near the inner curved wall of the circular container. The slots or holes allow parts of the hold module to enter into the tube, come into contact with the item within and prevent the item or items from falling out of the tube. The robotic doors, shutters, plates, pins, or bars of both the exit module, and/or the hold module, swing or slide open in the same direction as a set of shutters sliding open or closed vertically on both the exit and the hold module. Alternatively, they may slide in opposite directions such as set of shutters sliding open or closed vertically on the exit module and horizontally on the hold module. The shutters on the hold module may slide closed while they slid open on the shutters on the exit module.

In an alternative embodiment, the exit module and the hold module may be connected together. In an alternative embodiment, the items located within the wheel dispenser robot may be lifted upward by a mechanical device rather than falling out.

In another embodiment, the tubes of the wheel dispenser robots may be replaced with flat bars that may be attached to a rotating axle as illustrated within. The flat rectangular shaped bars may be attached to the axle by one of their tip ends to form a ring around the axle.

The connected ring of the rectangular-shaped bars may extend from the axle close to the curved inner wall within the circular container. Each rectangular bar may extend within a circular shaped container. Each individual bar may extend close to the curved inner wall of the circular container from the axle that it may be attached to. The items may be placed in between the walls of the circular container to secure the items.

Illustrated within FIG. 4 is a preordering process in which a customer (e.g., the customer 601) may have a recurring order delivered on a schedule. For example, the customer may place a particular order over the internet and have that order delivered to them the same day every month. The customer may be able to view and/or change their order over a display screen such as the computer monitor screen 170 or touch screen. This enables the automated delivery system, as described herein the present disclosure, to determine out how much of a particular item needs to be produced and ordered, which may prevent additional product waste.

The customer may order the same grocery list to be delivered to their residence on the third of every month. The customer may have a particular amount of time to change the selections on the grocery list before it may be delivered on the third of the month. For example, a customer could have specific brands of products delivered on a routine basis at a specific day and time. For example, a customer can have 2 boxes or containers of Corn Flakes, 3 loaves of Wonder Bread, 1 gallon of Smiths brand milk, and 4 tomatoes on the 3rd of every month. It may also be possible for the customer to have an order delivered to two or more separate locations on the same day. For example, a single customer may have an order delivered to them at their address and at their place of work on the same day. The order may be delivered to them by one vehicle making one stop at the customer's residence and a second stop at the customer's place of work. Alternatively, separate delivery vehicles may each drive to different locations to drop off the invoice/items that was ordered by a single customer. In this case, one delivery vehicle may deliver the invoice/items at the customer's residence, and a separate delivery vehicle may deliver the rest of the invoice/items at the customer's place of work. The customer may be able to view their ordered items on the computer monitor screen 170.

Vacuum Container Configurations

Figure 5:
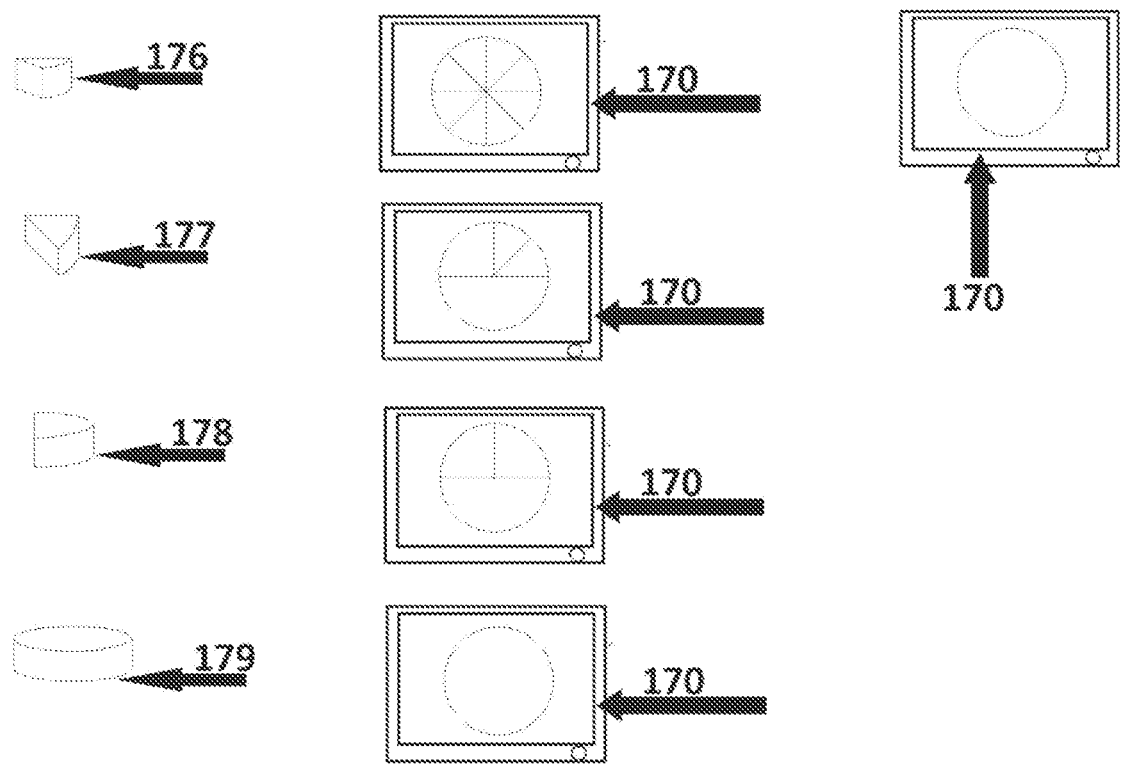
FIG. 5 illustrates a process of displaying instructions to a customer on a monitor screen.

FIG. 5 illustrates a set of digital container configuration instructions which in accordance to an embodiment instructs a customer through digital illustrations on a computer monitor screen 170 on how to arrange a set of vacuum containers 160 around an autonomously rotating axle 245 within the customer container 175. In one embodiment for example, a customer may be instructed to put 4 quarter triangle containers together to make a full circle, 2 quarter triangle containers to make a half circle plus another half circle container to form a full circle, 2 half circle containers together in order to form a full circle, or a single full circle container. In further embodiment, the vacuum containers 160 may be constructed into the shape of a quarter circle 177, full circle 179, a half circle 178, one-eighth of a circle 176, a trapezoid shaped, or trapezoid shaped with its longest side curved. The computer monitor screen 170 instructs the customer to arrange the vacuum containers 160 around the axle 245 in a particular way that may ensure that the autonomous placer robot 105 is able to properly position itself and then properly place the items into the correct vacuum container 160.

Guideway Track and Aerial Tramway

Figure 6:
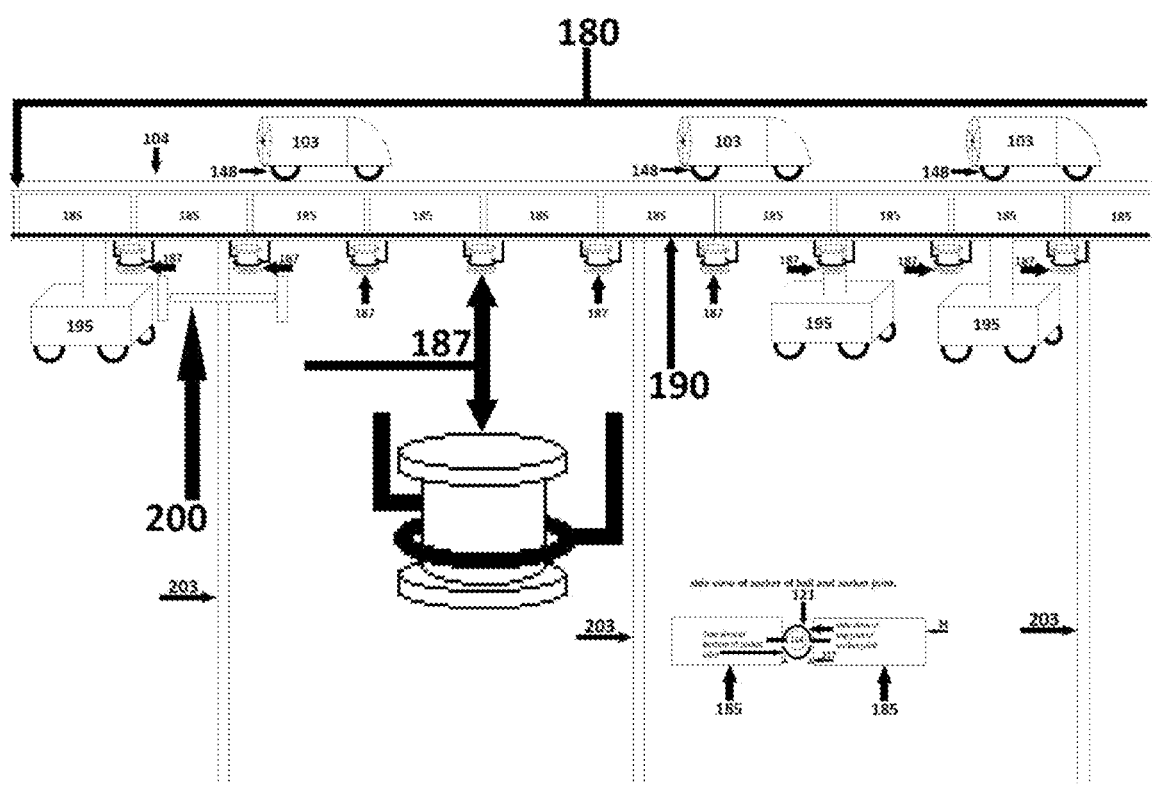
FIG. 6 illustrates a schematic diagram of a flexible guideway track.
Figure 11:
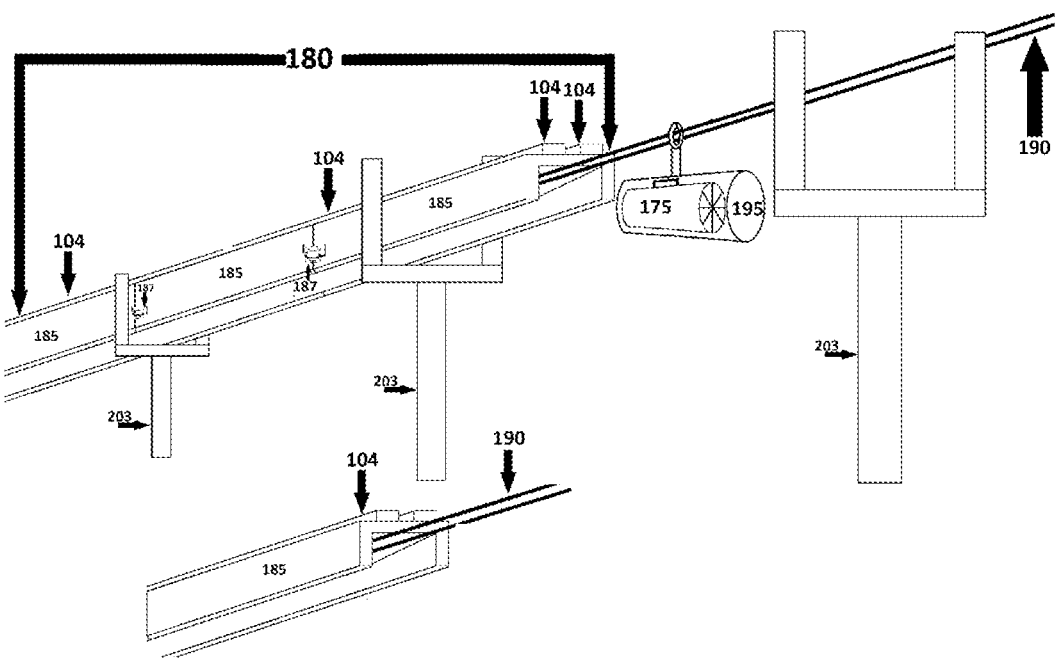
FIG. 11 illustrates another schematic diagram of a guideway track with groove and tramway cable in the groove.

FIGS. 6 and 11 illustrate the flexible guideway track 180 that may be made up of bars referred to herein as guideway segments 185. The guideway segments 185 may be connected to each other by flexible joints which makes the guideway track 180 flexible. Such joints may include, but are not limited to, ball and socket joints, and flexible cylinder joints 187 surrounded by rings, or hinges. There are long, bar-shaped objects that serve as tracks for the delivery vehicle 103. The bar-shaped objects touch each other by their tip ends on a top portion of the connected guideway segments 185.

The guideway segments 185 that make up guideway track 180 may be placed over and/or attached to one rope or wire; or a plurality of ropes and/or wires that extend down the lengths of the flexible guideway track 180. In some embodiments, a segment of the guideway track 180 may have a groove, a hole, or other type of opening that may enable a flexible object such as a rope, wire, or chain to be placed through. This may enable a row of the connected guideway segments 185 that make up the flexible guideway track 180 to be connected together by the flexible object/joints. Electric wire or a moving tramway cable 190 may enter in between the walls of the guideway track 180 in accordance with some embodiments (e.g., in a guideway track bottom side, as depicted in FIG. 11). Suitable shapes that make up the guideway track 180 include, but are not limited to, a rectangle, a cube, a cylinder, a flat oval resembling a popsicle stick, or any other suitable shape.

In one embodiment, the guideway segment 185 may have a groove that extends down its entire length. The grooves associated with shorter individual guideway segments 185 may form a single long groove when the individual guideway segments 185 may be attached next to each other. The long groove enables an object to extend from the delivery vehicle 103 and in between the walls of the groove that may help keep the delivery vehicle 103 securely fastened to guideway track 180. In an alternative embodiment, two flexi guideway tracks may be placed next to each other and form a long slot in between the two guideway segments 185. The long groove enables an object to extend from the delivery vehicle 103 and in between the two sets of the guideway tracks 180, thus retaining the delivery vehicle 103 on the guideway track 180. Furthermore, the guideway track 180 may be placed on the top of piers shaped like a cane. A spring may be placed at the tip end of the cane that extends down from the curve which may then be attached to the guideway track 180 to increase flexibility and durability of the track. The delivery vehicles 103 may ride over the attached guideway track 180 that extends down the top length of the flexible guideway track 180. Also, larger vehicles may transport human passengers over the flexible guideway track 180 in accordance with an embodiment.

In an embodiment, the pier elevator 200 may move the customer container 175 out of the delivery vehicle 103 and then move it upward to the guideway track 180. The pier elevator 200 may then place the customer container 175 into the delivery vehicle 103 on top of the guideway track 180. The delivery vehicle 103 may then travel over the guideway track 180 (e.g., on the guide-way 104, as shown in FIGS. 6 and 11) to a drop off location where the customer container 175 may be released from the delivery vehicle 103. This procedure is similar to the description of FIG. 1, except that the pier elevator 200 raises the customer container 175 up to the guideway track 180 rather than the aerial tramway 190.

Ball & Socket

In an alternative embodiment, ball and socket joints may be used to connect the guideway segments 185 that make up the guideway track 180. A ball 114 (as depicted in FIG. 6) may fit within a spherical shaped structure 121. The structure 121 may include two bowl-shaped structures. The rims of the bowls connect together in order to form a spherical shaped socket space. One of the bowl-shaped structures 121 of FIG. 6 is attached to a neck or solid structure that may in turn be connected to the guideway segment 185 that makes up the guideway track 180. In an embodiment, a lip or ledge extends from the structure 121 of FIG. 6. There may be screw holes in the ledge. The ledges and the screw holes of the bowl like structures 121 of FIG. 6 that make up a ball and socket joint enable the structures 121 to be screwed together with screws 117.

In some embodiments, there may be one or more springs attached to the ball 114, and/or the structure 121's interior, and/or its exterior surface (e.g., near the opening), and/or an object that connects the ball 114 to the guideway track 185, and/or an object that connects the socket structure 121 to the guideway segment 185. Springs may help make the joints of the guideway track 180 more stable. In an embodiment, a spring protrudes horizontally from the opening hole of the socket which forms the ball and socket joint. The solid neck to which the ball 114 may be attached extends in between the springs' curved surface areas.

Thus, the springs encircle the solid neck to which the ball 114 may be attached. In some embodiments, the spring may be wider on one end and narrower on the opposite end. In other words, the spring may be shaped like a cone, or the spring may have curved outer surface areas that curve inward so that the shape of the spring may resemble the end of a teardrop. If a spring that is wider on one end and narrower on the opposite end is used to construct a ball and socket joint, then the wider end of the spring connects near the hole of the socket's outer shell surface. The narrower end of the spring encircles the neck of the ball 114. In an alternative embodiment, the spring may have flat coils rather than rounded coils.

Each of the socket structures 121 may have an opening. The openings may align to form a hole on the ball and socket joint. The hole in the socket of the socket joint may be formed into any suitable shape which includes, but is not limited to, circular shape, diamond shape, 5-pointed star shape, 6-pointed star shape, 8-pointed star shape, cross shape, rectangular shape, and rectangular shape holes that form slits. The slits that come together to form a hole in the socket of the socket joint may be horizontal, vertical, or diagonal. The horizontal vertical or diagonal slits that form the hole in the socket of the socket joint may criss-cross each other. The holes in the socket of the socket joint that make up the guideway track 180 allow the neck that the ball 112 is attached to extend slightly into the socket structures 121 so that the guideway track 120 bends. These flexible joints provide stability to the guideway track 180 and may allow it to be built with less space and construction materials than conventional overhead guideways.

The guideway track 180 may be attached overhead to a row of pillars that may allow the delivery vehicles 103 or canisters to move high up off of the ground so that automobile traffic and pedestrians won't be obstructed by the delivery vehicles 103 or canister delivery vehicles moving along the guideway track 180. In one embodiment, there may be electrified rails that may be attached to and/or near a segment that makes up the guideway track 180.

One or more contact shoes that may be attached to the delivery vehicle 103 may come into contact with an electrified rail as the delivery vehicle 103 moves, which may in turn connect electricity to the delivery vehicle 103 and power its movement. In an alternative embodiment, the guideway segments 185 may be electrified. A contact shoe that may be attached to the delivery vehicle 103 may come in contact with the electrified wire as the delivery vehicle 103 moves, which may in turn power the movement of the delivery vehicle 103.

FIG. 6 illustrates an aerial tramway, cable-based transportation system that propels hanging tramway delivery vehicles from one location to another. Aerial tramway 190 may include a cable, a rope, or a conveyor. In some embodiments, the cables that make up the aerial tramway 190 may be underneath the connected segments that make up the guideway track 180 (as shown in FIGS. 6 and 11). In an embodiment, the cables of the aerial tramway 190 extend down the lengths of the grooves that may be on the undersides of the connected segments that make up the guideway track 180.

The conveyor may include two or more pulleys that may be closed within a loop of carrying medium. The loop of carrying medium may be composed of ropes, belts, wires, or chains. The loop of carrying medium may be attached to physical objects which may in turn be attached at the top of poles or piers. In an embodiment, the cable that makes up the aerial tramway 190 may be positioned underneath the guideway track 180 or in between the walls of a groove that extends along the underside length of the guideway track 180.

In an alternative embodiment, the aerial tramway 190 may include two supporting ropes, wires, or chains, and a third rope wire or chain that may provide propulsion for the attached cable car. The aerial tramway 190 may function much like a ski lift. Tramway vehicle 195 (or aerial tramway cable vehicle 195) may include the cargo carrying vessel 175 that may be attached to its body surface as an attachment unit that extends upward and connects to a tramway cable. The tramway vehicle 195 may carry the customer container 175 that contains items ordered by a customer. Attached to the tramway vehicle 195 and extending upward is a mechanism that attaches to the tramway cable above. Modules that may attach, touch, or interact with the tramway cable that makes up the aerial tramway 190 include, but are not limited to, tramway cable gripping mechanism hooks, clamps, robotic hands, wheels and/or any other suitable module. The tramway vehicle 195 may be moved off of the aerial tramway 190 by machines and/or they can come equipped with engines and wheels which enables them to exit the aerial tramway 190. In an embodiment, the tramway vehicle 195 may exit the tramway stop near the elevator 200 at the top of a pier and then drop off the customer's order on the elevator where it may be brought down to the waiting customer 601. In some embodiments, the cables that make up the aerial tramway 190 may be underneath the connected segments that make up the guideway track 180, as described above. Also, it may be possible for the cable or cables of the aerial tramway 190 to extend down the lengths of the grooves that are on the undersides of the connected guideway segments 185 that make up the guideway track 180, as described above. The conveyor may include two or more pulleys that may be closed within a loop of carrying medium.

FIG. 6 further shows the pier elevator 200 that moves up and down a pier in accordance with one embodiment. The pier elevator 200 may include at least one attached robotic clamp that grips deliver vehicles, and/or cable delivery vehicles, and/or customer containers. In one embodiment, the robotic clamp of the pier elevator 200 may be attached to an extendable robotic arm. The robotic arm may in turn be attached to at least one rotatable wheel.

In an alternative embodiment, an elevator floor may have shutters that open autonomously which enables the items on the elevator floor to drop downward into a cargo vessel of the delivery vehicle 103.

Figure 7:
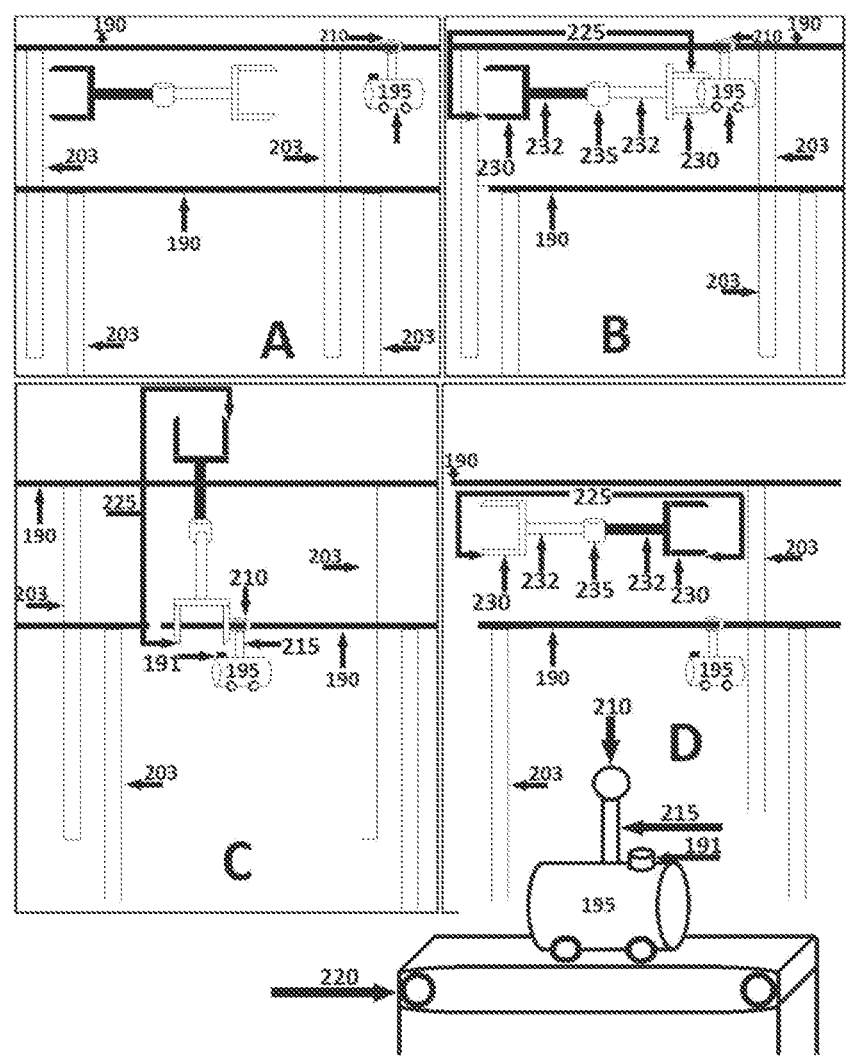
FIG. 7 illustrates a gripper that moves a tramway vehicle from one aerial tramway cable to another tramway cable moving in a different direction.

In one embodiment, the tramway vehicle 195 may include a cargo carrying vessel 175 along with an attached extending appendage 215 (as shown in FIG. 7) which includes a bar that extends upward from tramway vehicle 195's top surface. There may be a cable attachment mechanism 210 that may be attached to the top of the tramway vehicle 195's attached extending appendage 215. In an embodiment, the cable attachment mechanism 210 may include a solid loop that may controllably come apart. The cable attachment mechanism 210 may loop over the tramway cable that makes up the aerial tramway 190. The cable attachment mechanism 210 may also include a hook that may hook over the tramway cable that makes up the aerial tramway 190. In an embodiment, the cable delivery vehicle 195's extending appendage 215 may extend in length and/or tilt upward and downward. In an embodiment, the cable delivery vehicle 195 may include attached wheels and a motor so that it may drive along flat ground surfaces or guideways.

In an alternative embodiment, the cable delivery vehicle 195's cable attachment mechanism 210 may release the cable it is hanging from, after its bottom surface comes into contact with a road surface or guide way or the road surface or guideway is a short distance underneath the cable delivery vehicle 195. The tramway vehicle 195 may then be released from the tramway cable and then made to move onto the road surface or guideway and then made to move underneath another tram way cable. The cable attachment mechanism 210 of the extending appendage 215 may then loop over or otherwise attach itself to the tramway cable. The tramway vehicle 195 may then be carried forward by a new tramway cable.

In an alternative embodiment, the cable attachment mechanism 210 may release the cable it is hanging from, after the cable delivery vehicle 195's bottom surface comes into contact a conveyor 220 or the conveyor 220 is a short distance underneath the cable delivery vehicle 195.

The cable delivery vehicle 195 may then move onto the conveyor 220. The conveyor 220 may then move the delivery vehicle 195 underneath another tramway cable. The cable attachment mechanism 210 of the extending appendage 215 may then loop over the new tramway cable, and the cable delivery vehicle 195 may then be transported forward by a new tramway cable.

Tramway Train

In another embodiment, a cable car delivery vehicle 195 may have a chain of connected box cars (not shown) attached to its rear which may form a structure that resembles a miniature train or dual mode train. The box cars that are connected to the cable car delivery vehicle 195 can connect to each other in the same way train box cars are connected to each other. The box car at the back and at least one other boxcar or the cable car delivery vehicle 195 at the front that forms the train like structure will have an attached gripping mechanism attached at the top of a bar in order to enable the cable car delivery vehicle 195 and attached box cars to move on a tramway cable 190. The cable car delivery vehicle 195 that has a connected bar with a connected gripping mechanism may be able to extend up and retract down in a way similar to the way a luggage handle retracts up and down. Mechanical mechanisms may lock the bar and connected gripper into place.

In another embodiment, a single cable car delivery vehicle 195 that has connected box cars may be able to move by means of tramway cable 190 as well as move along ground surfaces such as sidewalks, a street, or guideway tracts. If this is the case, the cable car delivery vehicle 195 may be equipped with a motor and wheels so that it can move along conventional surfaces.

In another embodiment, the cable car delivery vehicle 195 that has connected box cars also has specialized wheels that allows it to move on conventional surfaces such as tarmac roads and sidewalks as well as guideway tracks.

FIG. 7 illustrates a cable car gripper 225 having at least one robotic clamp 230 that may be connected at a tip end of an arm 232. An opposite end of the arm 232 may be attached to a rotating axle 235 or wheel that may be mounted on the rotating axle 235. In some embodiments, the arm 232 may be able to extend in length. In an alternative embodiment, the clamp 230 may include a robotic mechanism that presses down on the cable delivery vehicle 195 from overhead and a solid rotating structure such as a wheel that moves underneath the cable delivery vehicle 195 or the cable delivery vehicle 195 may be moved over.

The robotic clamp 230 of the cable car gripper 235 may grip the tramway cable vehicles 195 and move them from a tramway cable that may be moving in one direction to a tramway cable that may be moving in a different direction. In one embodiment, the cable car delivery vehicle 195 may include a release button 191 that may be pushed and held down by the closing of the clamp 230 as it is being grabbed by the gripper 235. Cable car delivery vehicle 195's attached cable gripping appendage or cable gripping mechanism releases the cable as the release button 191 may be pushed by the closing of the grippers clamp 230. The clamp 210 closes and grabs a cable as the clamp 230 releases the cable car delivery vehicle 195. The Release button 191 may be attached to the front, top, bottom, or back of the cable car delivery vehicle 195.

Shown in FIG. 7 is an embodiment having the gripper 225 that moves a tramway vehicle from one aerial tramway cable to another tramway cable moving in a different direction by turning on its axle until the cable car delivery vehicle 195 and its attached release button 191 are in between the prongs of the grippers clamp 230. At that point, the clamp 230 may close the prongs of the gripper, thus pressing the release button 191. Cable car delivery vehicle 195's mechanism may open while the vehicle 195 may be held by the clamp 230, and at the same time, having its release button 191 being pressed by a gripping prong. The gripper may then simultaneously rotate on its axle, while holding the vehicle 195 and pressing the release button 191.

In some embodiments, the gripper 225 may stop rotating when the vehicle 195's clamp 230 is underneath cable "B" which may be moving in a different direction than tramway cable "A". At this point, the gripper 225 may reduce its squeeze pressure and release the tramway vehicles' button that may cause the tramway vehicle's cable gripping mechanism to attach itself to the tramway cable "B", at which point the tramway cable car may be moving in a different direction. In one embodiment, the cable gripping mechanism may be attached to the top of a bar or solid mechanism that may be attached to the surface of a tramway vehicle composed of two half ring structures that come together and form a full ring that may be split down the middle vertically. The two half rings (e.g., objects shaped like letter "C"/"C-shaped" objects) controllably come apart at the top side, where they meet so that the tramway cable fits in between them. Then the two half rings or objects shaped like letter "C"/"C-shaped" objects may come back together in order to form a ring around the tramway cable. In an alternative embodiment, the vehicle 195 may include a clasp button that grabs onto a moving cable when pushed. In one embodiment, there may be a moving member attached to the clamp of its gripper that pushes the clasp button of the vehicle 195. In an alternative embodiment, the ring like structure formed by 2 structures shaped like the letter "C" will not be split down the middle so one of the structures shaped like the letter "C" may be larger than the other.

Vehicle 195's clasp button may be attached to the front, top, bottom, or back portions of the vehicle 195, depending on the embodiment. There may be multiple robotic arms or stationary bar arms with attached clamps facing away from each other and connected to a single rotating axle of a gripper. The robotic arms of the gripper may be composed of bars, and/or tubes, and/or robotic arms resembling human arms. The gripping devices attached to the robotic arm of the gripper may include, but is not limited to, robotic clamps, or hands that resemble human hands.

Directing attention to FIG. 8, in one embodiment, the customer container 175 may be used to carry market goods ordered by the customer (e.g., the customer 601). In one embodiment, the customer container 175 may be cylinder-shaped. In another embodiment, the customer container 175 rotates on at least one short axle 243 that may be attached to the back of its outer surface and/or the delivery vehicle 103.

In an alternative embodiment, there may be a horizontally positioned autonomously rotating axle 245 attached inside of the customer container 175. The axle 245 extends down the customer container 175's length at the center. There may be objects attached to the axles, which may allow the vacuum containers 160 or bags to be attached. The axle 245 of the customer container 175 may controllably lock into place so it doesn't rotate, as well as and unlock so it can rotate again, in accordance to an embodiment. The customer container 175 may include at least one wheel 250 at its bottom, an extendable pull handle 255, and a lid 260 that may swing open and closed on at least one hinge.

In an alternative embodiment, the autonomously rotating axle 245 may extend from the center flat surface of a rotating slider plate 265. The slider plate 265 may include attached sliders 270 that may resemble drawer sliders 270. The sliders 270 extend from the face surface of the flat wheel 275 that may have an attachment mechanism attached to its back portion that may allow the slider plate 265 to attach and detach from the back inner wall of the customer container 175.

The sliders 270 may be attached to objects that may be connected to the autonomously rotating axle 245 that allows a row that makes up a ring of vacuum containers 160 or bags to slide further away from rotating slider plate 265 in much the same way a drawer slides away a kitchen counter. Controllable mechanisms located within the customer container 175 rotate the axle 245 and move the sliders 270 back and forth.

The vacuum container 160 may be attached to an axle 290 of the customer container 175, which may also be attached to the autonomously rotating axle 290 of the circular refrigerator 285. The interior diameter of the customer container 175 may be identical to the interior diameter of the circular refrigerator 285, in accordance with an embodiment.

A customer may switch a container from a previous order and pick up a new customer container 175 filled with ordered goods at a drop off station or the elevator 200. In one embodiment, the elevator 200 brings down the new customer container 175 filled with ordered goods from the top of a pier. The customer may pick up the new container 175 filled with goods off of the elevator 200, and then places their empty customer container obtained from a previous order onto the elevator 200. The elevator 200 may then bring the empty customer container up the pier where it may be carried away by a vehicle.

FIG. 8 further illustrates a slit 280 or opening at the top of the delivery vehicle 103's cylindrical shaped cargo vessel 175. The slit or opening of the delivery vehicle 103 may expose the opening of the vacuum container 160 or bag so that the placer robot 105 may dispense items into the vacuum container 160 or bag that may be inside the delivery vehicle 103. A customer container may also come equipped with a slit on its outer surface that may expose the opening of the vacuum container 160 or bag so that the placer robot 105 may dispense items into the vacuum container 160 or bag that may be disposed inside the customer container 175.

FIG. 8 also illustrates the vacuum container 160 that may be a container that may have the air within removed by a pump, flushed out, or removed by some other means to slow the pace at which the perishable goods stored within decay. There may be openings and/or shutters that may uncover openings located on the surface of the vacuum container 160. The placer robot 105 may place a market good through the opening and into the vacuum container 160. Triangle shaped vacuum containers may connect to an axle that may form a single larger circle made up of smaller triangle shape vacuum containers. This will resemble smaller triangle-shaped pizza slices connecting together to form a larger circular-shaped pizza pie.

The product handling modules 167 (or the product handling contraptions 167 described above) of the placer robot 105 may grab items dispensed from its dispensing unit 164 and place them into the vacuum container 160 within the delivery vehicle 103. In an embodiment there may be multiple rings of connected vacuum containers positioned close to each other. A smaller ring of vacuum containers 160 may be surrounded by a larger ring of vacuum containers. In this arrangement, the innermost ring of triangular shaped vacuum containers may be connected to and surround the rotating axle 245. The innermost ring of the vacuum containers 160 that may be closest to the rotating axle 245 may have the smallest diameter. A larger ring of trapezoid shaped vacuum containers surrounds the innermost ring of the vacuum containers 160. In an embodiment, an even larger ring of trapezoid shaped vacuum containers may surround the ring described above. There may be any desired number of rings of vacuum containers that may be arranged within a ring and surround a smaller ring. The trapezoid shaped vacuum containers may have any of two of their sides curved. Vacuum containers may be arranged within multiple rings of vacuum containers inside of the customer container 175, the axle 245 or the slider 270 of a slider plate, or the circular refrigerator 285.

FIG. 8 illustrates the circular refrigerator 285. The circular refrigerator 285 may have curved inner walls which makes it more energy efficient that conventional refrigerators and provides the proper space for shelves that are able to turn on an axle. The circular refrigerator 285 may be a container that may be constructed into any suitable size or shape, which includes, but is not limited to, cylindrical shaped, oval shaped, ovoid shaped, shaped like a pill, shaped like a grain silo with a domed ceiling or any other suitable size or shape. The vertically positioned axle 290 may controllably rotate and may be located within the circular refrigerator 285 at its center. There may be vacuum containers and/or vacuum bags attached to and/or surrounding the 290 axle that may be within the circular refrigerator 285. The axle 290 and the attached vacuum containers 160 and/or bags may rotate 360 degrees. The circular movement of the axle 290 and the attached vacuum bags and/or containers within the circular refrigerator 285 may bring a vacuum bag or container 160 that has air within it in contact with a refrigerator vacuum pump. There may be bars that extend horizontally from the rotating axle 290 which has attached refrigerator sliders that resemble drawer sliders. The vacuum containers 160 or bags may have objects affixed to the bottoms and or sides of their surface that may allow them to attach to the refrigerator sliders. The connected vacuum containers and the sliders may then be able to be pulled out of the circular refrigerator 285 like a drawer slides out of a kitchen counter. An entire row of vacuum containers may be pulled out of the circular refrigerator 285 in this manner. There may be wheels attached to the sliders in accordance with an embodiment. The axle 290 may have triangle shaped grooves to which the tip ends of the triangle shaped containers may fasten.

Furthermore, the axle 290 may be cylindrical shaped, shaped like a 6 pointed star, shaped like an 8 pointed star, a star with more than 8 points, cross shaped or any other suitable shape or combination of suitable shapes.

Furthermore, the axle 290 may be cylindrical shaped, shaped like a 6 pointed star, shaped like an 8 point star, or may be constructed into any suitable shape. The vacuum container 160 or bag that attaches to the axle 245 of the customer container 175 may also be attached to the axle 290 of the circular refrigerator 285. The interior diameter of the customer container 175 may be identical to the interior diameter of the circular refrigerator 285, in accordance with an embodiment.

FIG. 8 illustrates an embodiment in which the circular refrigerator 285 has at least one pump 310 located within its inner walls or attached to a horizontally positioned bar, ledge, or other solid object within the circular refrigerator 285. The bar, ledge or solid object that the vacuum pump 310 is attached to may controllably extend and retract. In an alternative embodiment, the pump 310 may be attached to a bar, ledge or other solid object that may be vertical rather than horizontal and may be able to retract and extend from right to left or vice versa. The vacuum pump 310 may controllably remove air that may be inside the vacuum container 160 or bag.

The vacuum pump 310 may extend downward from the horizontal bar it is attached to. The horizontal bar may extend horizontally from the inner wall of the circular refrigerator 285 and/or a vertically positioned tube attached to the center interior of the circular refrigerator 285.

The tube that the horizontal bar is connected to encircles the circular refrigerator 285's rotating axle. Structures such as bars may be connected to and encircle the autonomously rotating axle 290. Triangular shaped vacuum containers may be able to connect to the solid structures that extend from the rotating axle. The triangular shaped vacuum containers may be placed next to each other on the rotating axle to form a rounded carousel. When the carousel controllably rotates, the vacuum container 160's opening moves during the axle rotation to a space that may be directly underneath the pump 310. The vacuum pump 310 may deploy and remove air from the vacuum container 160. In an alternative embodiment, the vacuum pump 310 comes up from underneath, or beside into the opening of the vacuum container 160. In another embodiment, the horizontal bar or object may contract back and forth.

Figure 9:
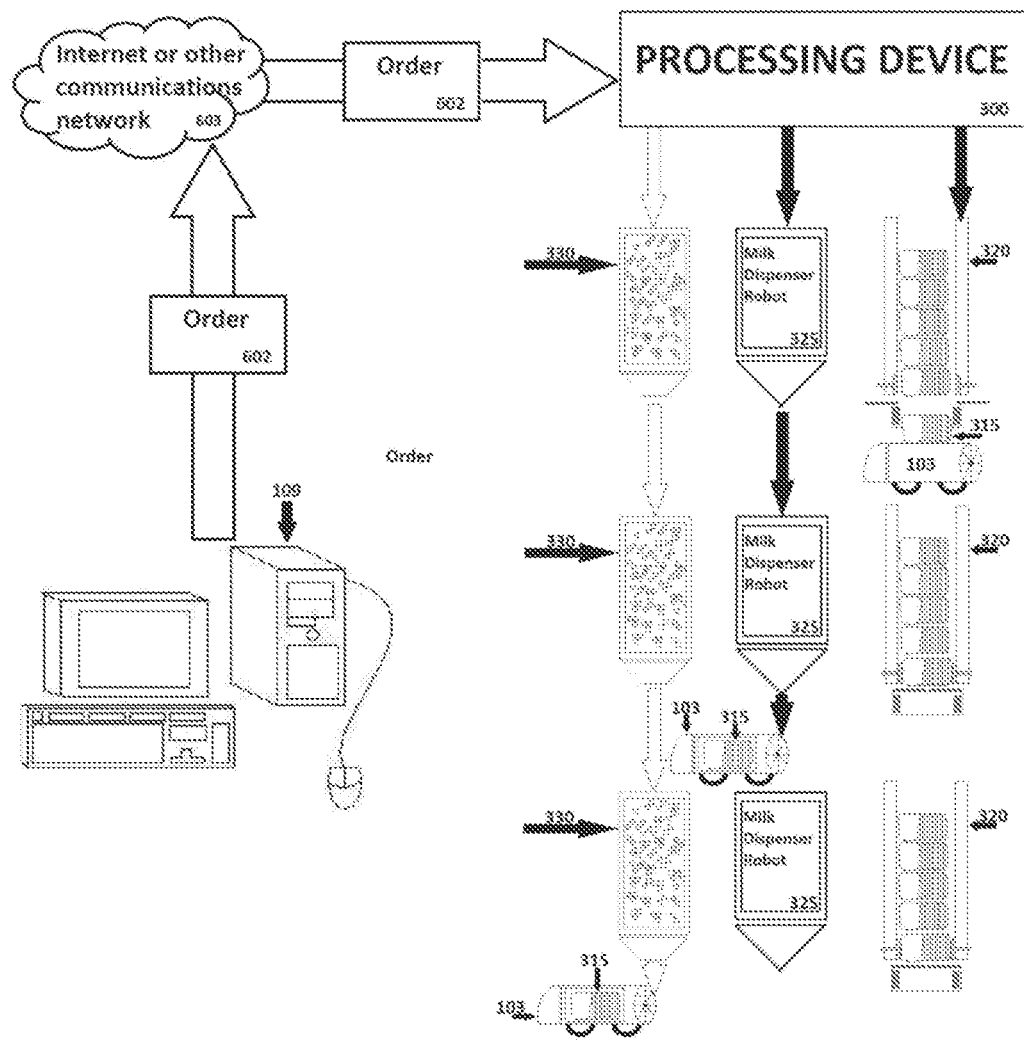
FIG. 9 illustrates a process of dispensing multiple items ordered by a customer.

FIG. 9 illustrates a process in which the customer order 602 can be split up by the processing device 300, into separate parts with each individual part of the order consisting of a different product ordered by the consumer 601. First, the consumer 601 may place the order 602 consisting of different types of market products over the communications network 603 such as the internet. The processing device 300 may receive the customer order 602 consisting of the different products and break it down into different parts such as bread, milk, and cereal. The processing device 300 may then send a signal to a bread dispensing robot 320 to release 1 loaf of bread into the customer delivery vehicle 103's vacuum container when it approaches the bread dispensing robot 320. The delivery vehicle 103 may then approach a milk dispensing robot 325 and then the processing device 300 may send a signal to the milk dispensing robot 325 to release milk into the customer delivery vehicle 103's vacuum container 160. The delivery vehicle 103 may then approach a cereal dispensing robot 330 and then the processing device 330 may send a signal to the cereal dispensing robot 330 to release cereal into the customer delivery vehicle 103's vacuum container 160.

Figure 10:
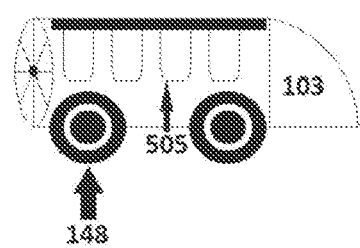
FIG. 10 illustrates a design of a delivery vehicle.

FIG. 10 illustrates a sliding door 505 that only opens part of the way and then locks into place creating an opening just large enough for a consumer to grab their items. In one embodiment, a door on the delivery vehicle 103 or the customer container 175 may open and reveal an opening just large enough for the consumer 601 to reach in and grab the container or desired containers within the customer container 175. The horizontal axle that the vacuum containers are connected to temporarily locks into place so that it may be unable to spin. The axle only unlocks and regains its ability to spin after the customer 601 may have retrieved their ordered containers and the sliding door on the delivery vehicle 103 may have closed back up and locked. Having a customer retrieve an item in this way will ensure that the customer won't be able to remove any containers from the delivery vehicle 103 or the customer container 175, except the products that were ordered. The sliding door 505 may be able to lock at multiple points along its opening path. When a sliding door on the delivery vehicle 103 opens part way, it locks and won't be movable. A door that may be able to open partially and then lock will make it so that different customers each of which have different numbers of containers of the same size and shape being delivered to them can retrieve their varying numbers of containers from the same door opening on same delivery vehicle 103. For example, if a consumer needs to remove two containers, then the sliding door will open partially to a point and lock temporarily so that it won't be able to slide further; and reveal an opening that's just large enough for the customer to grab the two containers that were ordered while the horizontal axle that the two ordered containers are in contact with will lock temporarily in place so that it won't be able to spin. The axle will only unlock and regain its ability to spin after the customer has retrieved their ordered containers and the sliding door on the delivery vehicle 103 has closed back up and is locked so that it can't open. If the next customer needs to obtain three containers, then the sliding door 505 partially opens and locks to a greater degree than the previous customer who only had two containers being delivered to them, so that it won't be able to slide any further; and reveal an opening that's just large enough for the customer to grab the three containers that were ordered while the horizontal axle that the three ordered containers are in contact with locks temporarily in place so that it won't be able to spin. The axle will only unlock and regain its ability to spin after the consumer has retrieved their ordered containers and the sliding door on the delivery vehicle 103 has closed back up and is locked so that it can't open. The sliding door 505 and opening on a canister may be constructed into any number of suitable sizes and shapes which includes, but is not limited to, a rectangle, a square, a circle, a triangle, curved, a curved rectangle or rectangle with a curved flat surface, or any other suitable size or shape.

Figure 12:
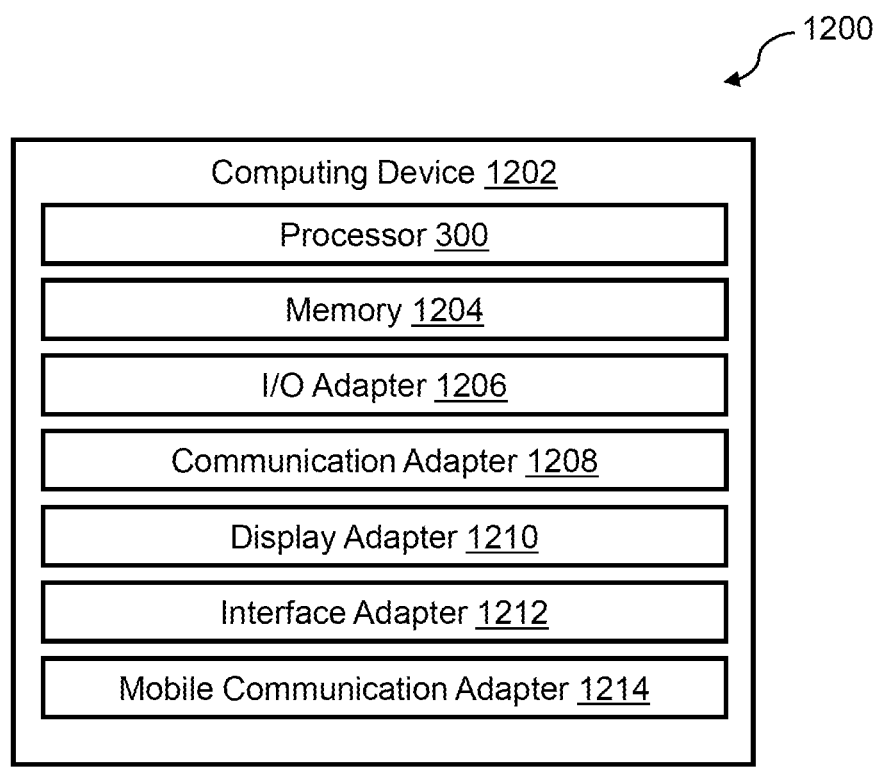
FIG. 12 illustrates a block diagram of an exemplary computing environment in accordance with the present disclosure.

FIG. 12 illustrates a block diagram of an exemplary computing environment 1200 in accordance with the present disclosure. The computing environment 1200 may include a computing device 1202 (or computer 1202). The environment and system described herein can be implemented in hardware, software (e.g., firmware), or a combination thereof. In an exemplary embodiment, a hardware implementation can include a microprocessor of a special or general-purpose digital computer, such as a personal computer, workstation, minicomputer, or mainframe computer. Computer 1202 therefore can embody a general-purpose computer. In another exemplary embodiment, the implementation can be part of a mobile device, such as, for example, a mobile phone, a personal data assistant (PDA), a tablet computer, etc.

As shown in FIG. 12, the computer 1202 includes the processor 300. Computer 1202 also includes memory 1204 communicatively coupled to processor 300, and one or more input/output adapters 1206 that can be communicatively coupled via system bus (not shown).

Memory 1204 can be communicatively coupled to one or more internal or external memory devices via a storage interface (not shown). Communication adapter 1208 can communicatively connect computer 1202 to one or more networks (not shown). System bus can communicatively connect one or more user interfaces via input/output (I/O) adapter 1206. I/O adapter 1206 can connect a plurality of input devices (not shown) to the computer 1202. Input devices can include, for example, a keyboard, a mouse, a microphone, a sensor, etc. System bus can also communicatively connect one or more output devices (not shown) via the I/O adapter 1206. Output device can include, for example, a display, a speaker, a touchscreen, etc.

Processor 300 is a hardware device for executing program instructions (aka software), stored in a computer-readable memory (e.g., memory 1204). Processor 300 can be any custom made or commercially available processor, a central processing unit (CPU), a plurality of CPUs, an auxiliary processor among several other processors associated with the computer 1202, a semiconductor-based microprocessor (in the form of a microchip or chip set), or generally any device for executing instructions. Processor 300 can include a cache memory, which can include, but is not limited to, an instruction cache to speed up executable instruction fetch, a data cache to speed up data fetch and store, and a translation lookaside buffer (TLB) used to speed up virtual-to-physical address translation for both executable instructions and data. Cache memory can be organized as a hierarchy of more cache levels.

Processor 300 can be disposed in communication with one or more memory devices (e.g., RAM, ROM, one or more external databases, etc.) via a storage interface (not shown). Storage interface can also connect to one or more memory devices including, without limitation, one or more databases, and/or one or more other memory drives (not shown) including, for example, a removable disc drive, etc., employing connection protocols such as serial advanced technology attachment (SATA), integrated drive electronics (IDE), IEEE-1394, universal serial bus (USB), fiber channel, small computer systems interface (SCSI), etc.

The memory drives can be, for example, a drum, a magnetic disc drive, a magneto-optical drive, an optical drive, a redundant array of independent discs (RAID), a solid-state memory device, a solid-state drive, etc. Variations of memory devices can be used for implementing, for example, list all databases from other figures.

Memory 1204 can include random access memory (RAM) and read only memory (ROM). RAM can be any one or combination of volatile memory elements (e.g., DRAM, SRAM, SDRAM, etc.). ROM can include any one or more nonvolatile memory elements (e.g., erasable programmable read only memory (EPROM), flash memory, electronically erasable programmable read only memory (EEPROM), programmable read only memory (PROM), tape, compact disc read only memory (CD-ROM), disk, cartridge, cassette or the like, etc.). Moreover, memory 1204 can incorporate electronic, magnetic, optical, and/or other types of non-transitory computer-readable storage media. Memory 1204 can also be a distributed architecture, where various components are situated remote from one another, but can be accessed by processor 300.

The instructions in memory 1204 can include one or more separate programs, each of which can include an ordered listing of computer-executable instructions for implementing logical functions. In the example of FIG. 12, the instructions in memory 1204 can include an operating system (not shown). Operating system can control the execution of other computer programs and provides scheduling, input-output control, file and data management, memory management, and communication control and related services.

The program instructions stored in memory 1204 can further include application data, and for a user interface (not shown).

I/O adapter 1206 can be, for example but not limited to, one or more buses or other wired or wireless connections. I/O adapter 1206 can have additional elements (which are omitted for simplicity) such as controllers, microprocessors, buffers (caches), drivers, repeaters, and receivers, which can work in concert to enable communications. Further, I/O adapter 1206 can facilitate address, control, and/or data connections to enable appropriate communications among the aforementioned components.

The computer 1202 can further include a display adapter 1210 to couple to one or more displays. The computer 1202 can further include an interface adapter 1212 to operatively connect one or more input/output (I/O) devices to computer 100. For example, interface adapter 1212 can connect a keyboard and mouse, a touchscreen, a speaker, a haptic output device, or other output device. Output devices can include but are not limited to a printer, a scanner, and/or the like. Other output devices can also be included, although not shown. Finally, the I/O devices can further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like.

According to some embodiments, computer 1202 can include a mobile communication adapter 1214. Mobile communications adapter 1214 can include GPS, cellular, mobile, and/or other communications protocols for wireless communication. In some embodiments, computer 1202 can further include communication adapter 1208 for coupling to a network (not shown).

Network can be an IP-based network for communication between computer 1202 and any external device. Network transmits and receives data between computer 1202 and devices and/or systems external to computer 1202. In an exemplary embodiment, network can be a managed IP network administered by a service provider. Network can be implemented in a wireless fashion, e.g., using wireless protocols and technologies, such as WiFi, WiMax, etc. Network can also be a wired network, e.g., an Ethernet network, an ARINC 429 network, a controller area network (CAN), etc., having any wired connectivity including, e.g., an RS232 connection, R5422 connection, etc. Network 106 can also be a packet-switched network such as a local area network, wide area network, metropolitan area network, Internet network, or other similar type of network environment. The network can be a fixed wireless network, a wireless local area network (LAN), a wireless wide area network (WAN) a personal area network (PAN), a virtual private network (VPN), intranet or other suitable network system.

Network can operatively connect computer 1202 to one or more devices including device, device, and device. Network can also connect computer 1202 to one or more servers such as, for example, server.

If computer 1202 is a PC, workstation, laptop, tablet computer and/or the like, the instructions in the memory 1204 can further include a basic input output system (BIOS) (omitted for simplicity). The BIOS is a set of routines that initialize and test hardware at startup, start operating system, and support the transfer of data among the operatively connected hardware devices. The BIOS is typically stored in ROM so that the BIOS can be executed when computer 1202 is activated. When computer 1202 is in operation, processor 300 can be configured to execute instructions stored within the memory 1204, to communicate data to and from the memory 1204, and to generally control operations of the computer 1202 pursuant to the instructions.

The present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a hard disk, a random-access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

What is claimed is:

1. A method of selling goods to a customer, the method comprising:
   causing, by a processor, loading of a variety of goods into a plurality of dispenser robots;
   receiving, by the processor, an order for goods from the customer over a communications network, via a user device;
   causing, by the processor, a delivery vehicle to move along a guideway to at least one location of at least one dispenser robot of the plurality of dispenser robots responsive to receiving the order, wherein causing the delivery vehicle to move along the guideway comprises engaging with a bicycle wheel wind turbine electricity generator as the delivery vehicle travels along the guideway;
   causing, by the processor, to dispense goods from the at least one dispenser robot into the delivery vehicle, wherein the delivery vehicle comprises a customer container;
   causing, by the processor, to load the delivery vehicle onto an aerial tramway responsive to causing dispensing of the goods;
   causing, by the processor, the delivery vehicle to move to a destination point on the aerial tramway; and
   transmitting, by the processor, a notification to the user device to collect the goods from the delivery vehicle at the destination point.

2. The method of claim 1, wherein causing the delivery vehicle to move along the guideway comprises propelling a push object along the guideway and moving the delivery vehicle along the guideway by bringing the push object into contact with the delivery vehicle and pushing the delivery vehicle to a desired location along the guideway.

3. The method of claim 1, wherein causing dispensing of goods comprises inserting goods into a vacuum container located in the delivery vehicle.

4. The method of claim 1, wherein causing dispensing of goods comprises inserting goods into a temperature-controlled portion of the delivery vehicle.

5. The method of claim 1 further comprising transmitting instructions to the customer to arrange reusable vacuum containers or bags within the customer container.

6. A system for distribution of goods from a storage facility to a customer, the system comprising:
   a delivery vehicle having a storage area for items purchased by a customer, wherein the delivery vehicle comprises a customer container within the storage area, and wherein the customer container is cylindrical in shape and contains an autonomously rotating axle, disposed within the center of the customer container to which a plurality of rings of vacuum containers or vacuum bags are attached;
   a dispensing robot configured to controllably dispense goods into the customer container on the delivery vehicle;
   a guideway on which the delivery vehicle travels;
   an aerial tramway along which the delivery vehicle is carried; and
   a pier elevator, wherein the pier elevator is configured to move the customer container vertically between the guideway and the aerial tramway or between a customer and either the guideway or the aerial tramway.

7. The system of claim 6, wherein the pier elevator includes a robotic clamping mechanism configured to grasp the delivery vehicle.

8. The system of claim 6, wherein the guideway is flexible and comprises a plurality of solid guideway segments that are connected lengthwise by flexible ball and socket connections.

9. The system of claim 6 further comprising a plurality of dispensing robots, wherein the plurality of dispensing robots dispense respective item types into a cargo vessel of the delivery vehicle, and wherein the plurality of dispensing robots comprises the dispensing robot.

10. The system of claim 9, wherein multiple dispenser robots dispense different types of items into the cargo vessel of the delivery vehicle.

11. The system of claim 6, wherein the delivery vehicle and the customer container comprise sliders that attach to the autonomously rotating axle and enable the vacuum container to slide along a length of the autonomously rotating axle.

12. The system of claim 6, wherein the delivery vehicle has a plurality of controllably closeable loops or clamps that connect the delivery vehicle to the aerial tramway.

13. The system of claim 6, wherein the guideway includes a plurality of guideway electricity generators including bicycle wheel wind turbine generators configured to generate electricity as the delivery vehicle travels along the guideway and from wind currents.

14. The system of claim 13, wherein the guideway electricity generators further comprise excitors, rotors, stators, and exciters, wherein the rotors are constructed of a series of electromagnets positioned inside of the stators.

15. A method of selling goods to a customer, the method comprising:
    receiving, by a processor, an order for goods from the customer over a communications network, via a user device;
    causing, by the processor, a delivery vehicle to move along a guideway to at least one location of at least one dispenser robot of a plurality of dispenser robots responsive to receiving the order;
    causing, by the processor, to dispense goods from the at least one dispenser robot into the delivery vehicle, wherein the delivery vehicle comprises customer container, and wherein the customer container is cylindrical in shape and contains an autonomously rotating axle, disposed within the center of the customer container to which a plurality of rings of vacuum containers or vacuum bags are attached;
    causing, by the processor, to load the delivery vehicle onto an aerial tramway responsive to causing dispensing of the goods;
    causing, by the processor, to move the delivery vehicle to a destination point on the aerial tramway; and
    transmitting, by the processor, a notification to the user device to collect the goods from the delivery vehicle at the destination point.

16. The method of claim 15, wherein causing the delivery vehicle to move along the guideway comprises propelling a push object along the guideway and moving the delivery vehicle along the guideway by bringing the push object into contact with the delivery vehicle and pushing the delivery vehicle to a desired location along the guideway.

17. The method of claim 15, wherein causing the delivery vehicle to move along the guideway comprises engaging with a bicycle wheel wind turbine electricity generator as the delivery vehicle travels along the guideway.

18. The method of claim 15, wherein causing dispensing of goods comprises inserting goods into a vacuum container located in the delivery vehicle.

19. The method of claim 15, wherein causing dispensing of goods comprises inserting goods into a temperature-controlled portion of the delivery vehicle.

20. The method of claim 15 further comprising transmitting instructions to the customer to arrange reusable vacuum containers or bags within the customer container.

* * * * *